Figure 1:
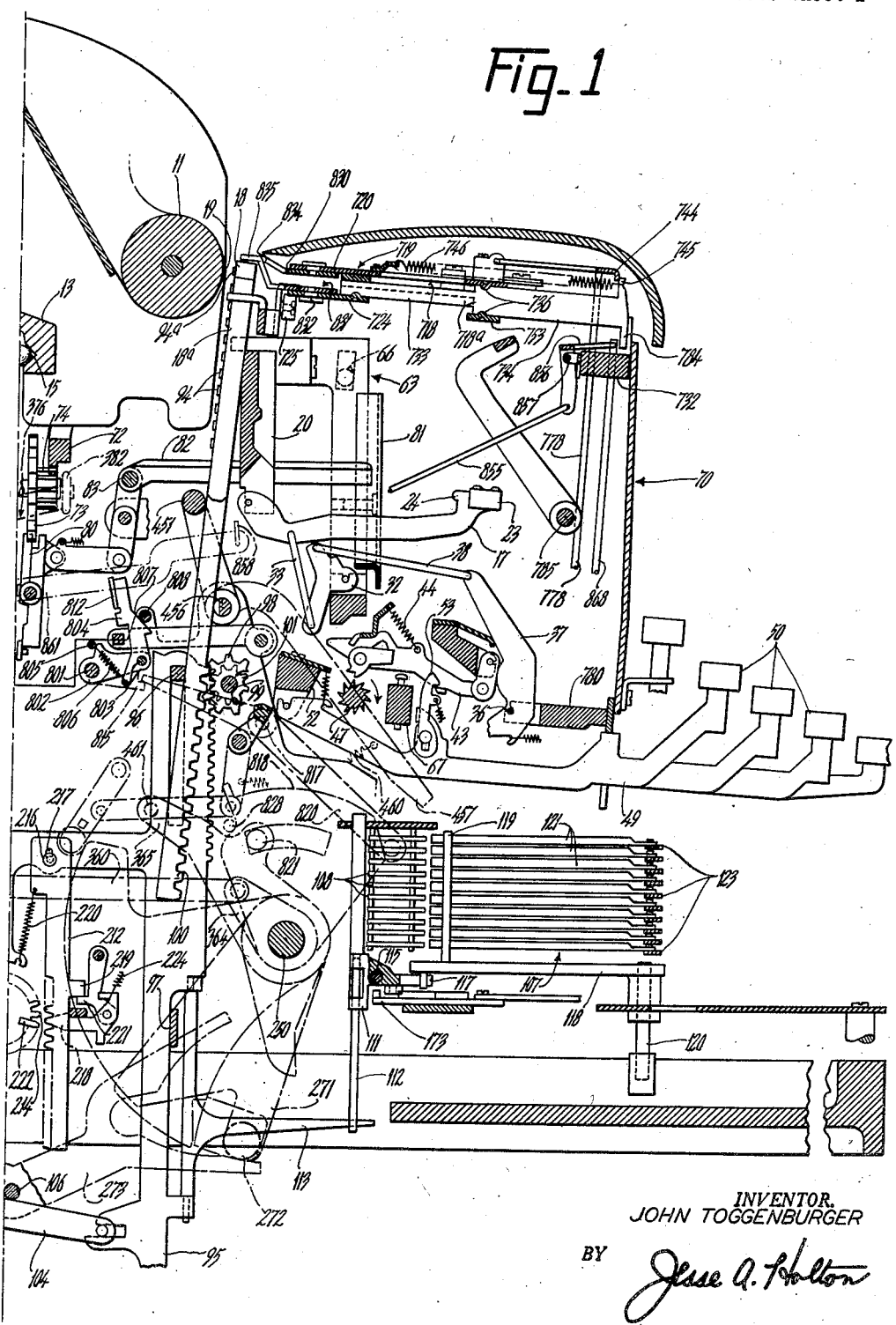

Dec. 31, 1957  J. TOGGENBURGER  2,818,017
COMBINED TYPEWRITER AND PRINTING COMPUTING MACHINE
Filed Aug. 13, 1954  9 Sheets-Sheet 2

INVENTOR
JOHN TOGGENBURGER
BY Jesse A. Holton
ATTORNEY

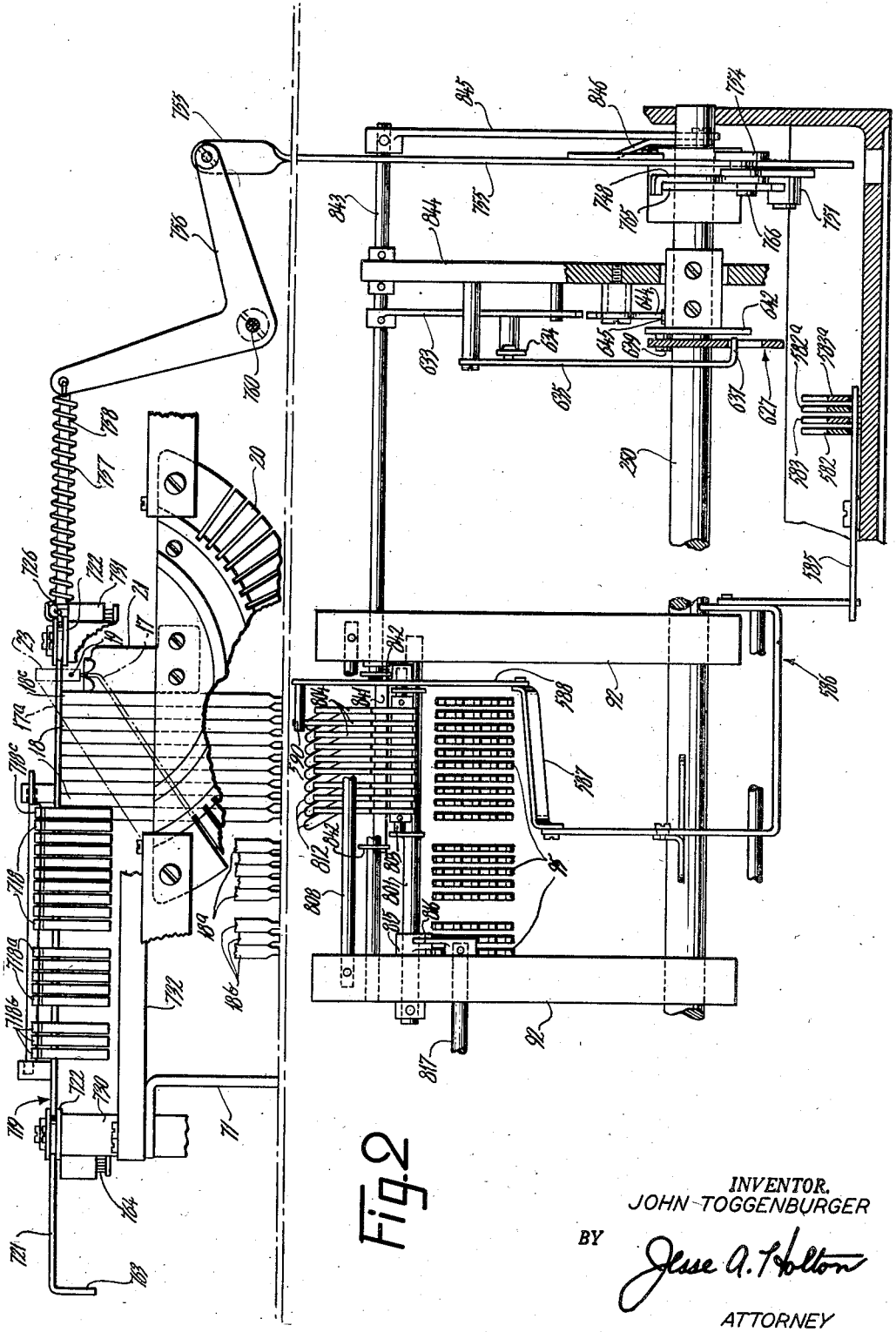

Dec. 31, 1957  J. TOGGENBURGER  2,818,017
COMBINED TYPEWRITER AND PRINTING COMPUTING MACHINE
Filed Aug. 13, 1954  9 Sheets-Sheet 4
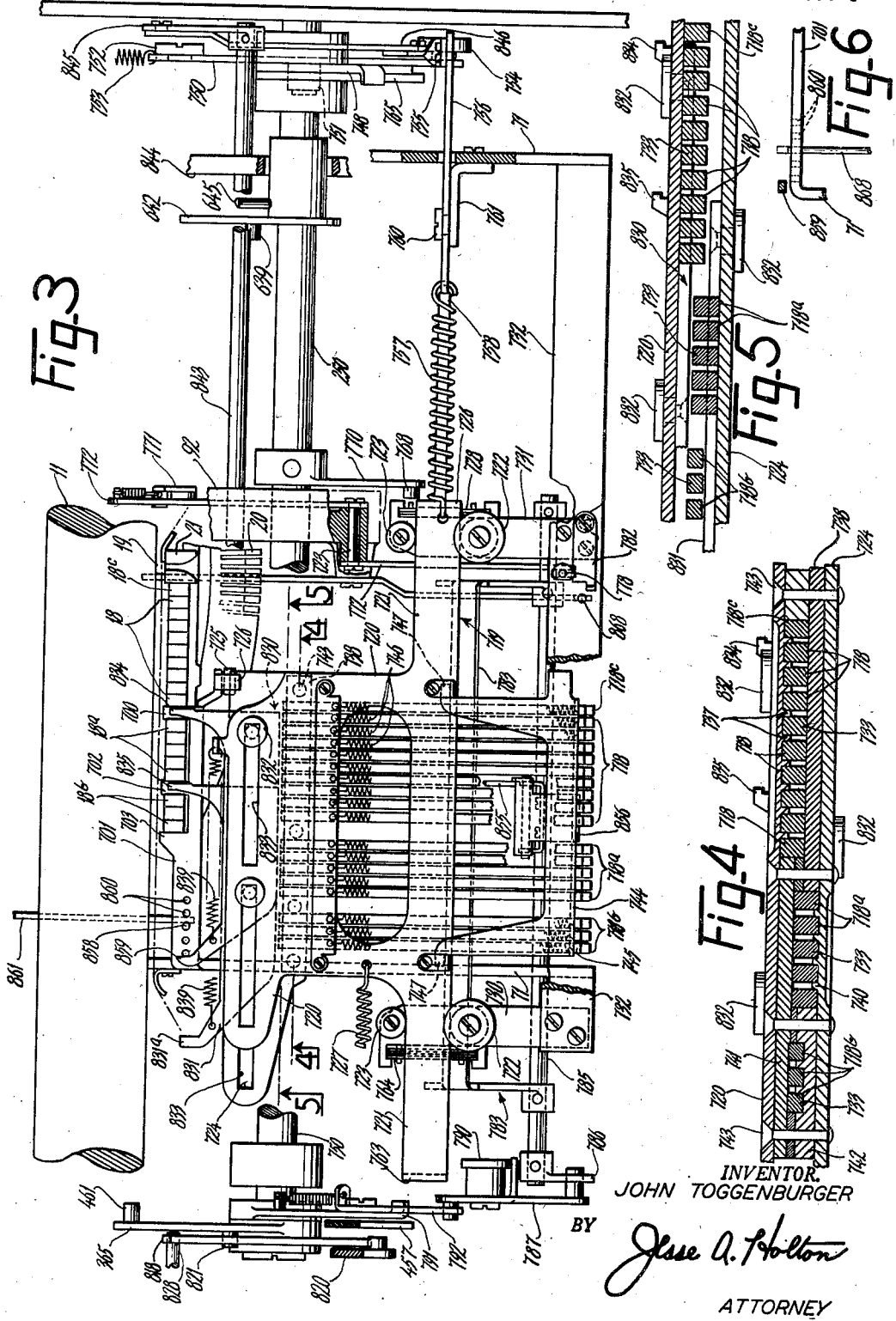
INVENTOR.
JOHN TOGGENBURGER
BY
Jesse A. Hilton
ATTORNEY Dec. 31, 1957  J. TOGGENBURGER  2,818,017
COMBINED TYPEWRITER AND PRINTING COMPUTING MACHINE
Filed Aug. 13, 1954  9 Sheets-Sheet 5

INVENTOR.
JOHN TOGGENBURGER
BY
Jesse A. Holton
ATTORNEY

Dec. 31, 1957     J. TOGGENBURGER     2,818,017
COMBINED TYPEWRITER AND PRINTING COMPUTING MACHINE
Filed Aug. 13, 1954     9 Sheets-Sheet 6
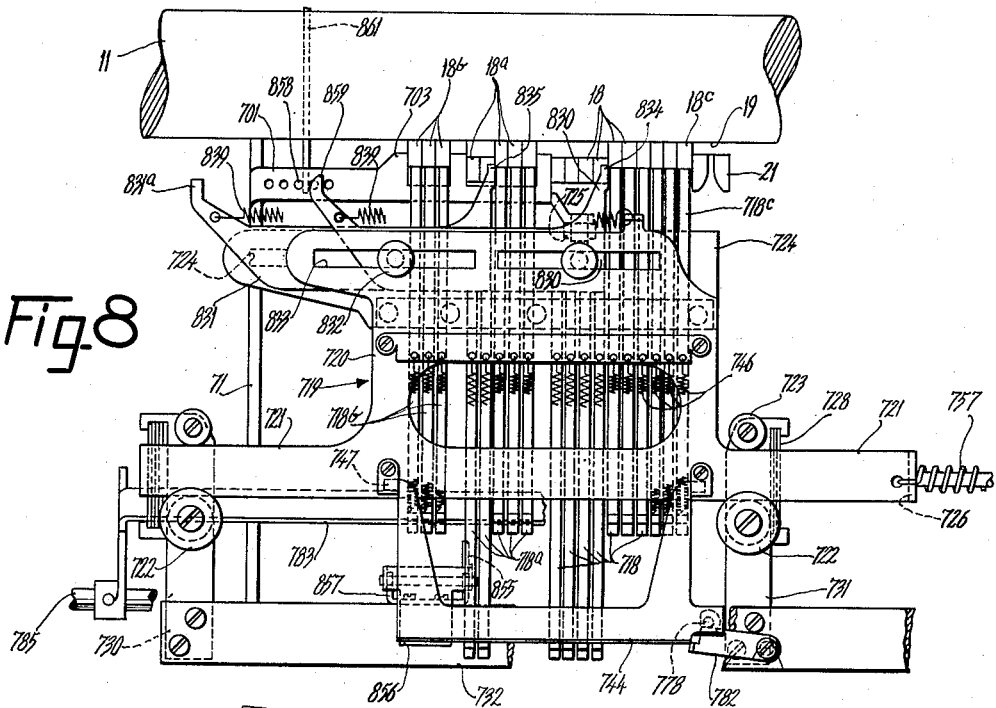
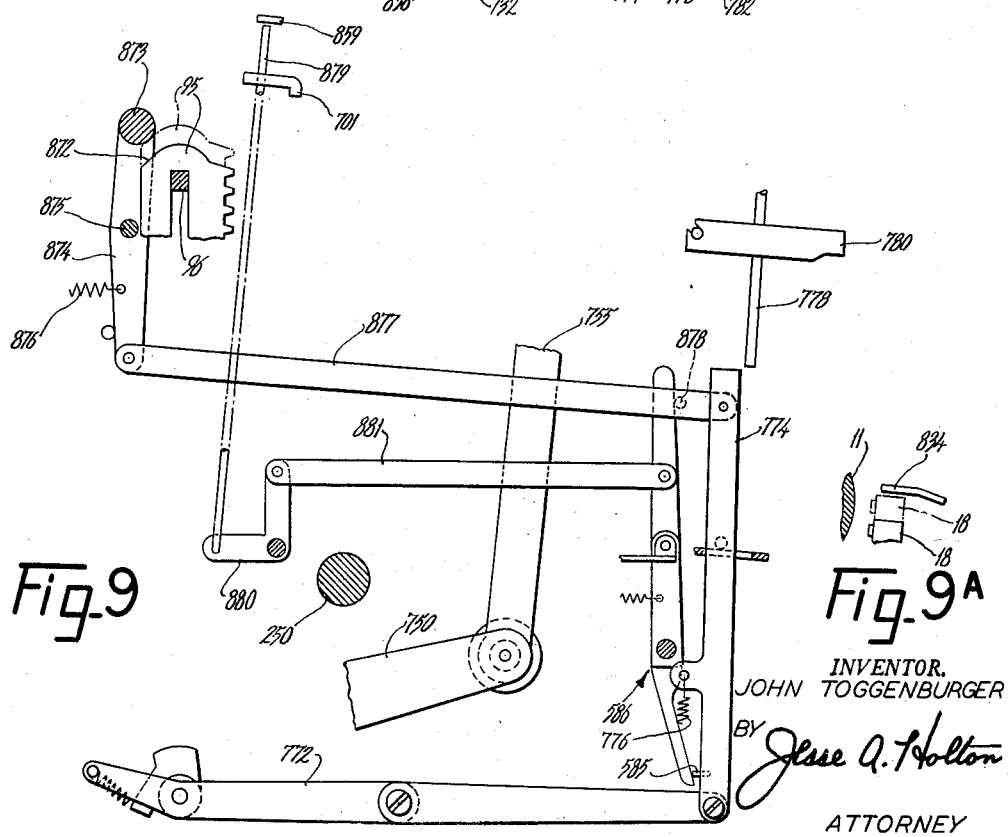
INVENTOR.
JOHN TOGGENBURGER
BY Jesse A. Holton
ATTORNEY

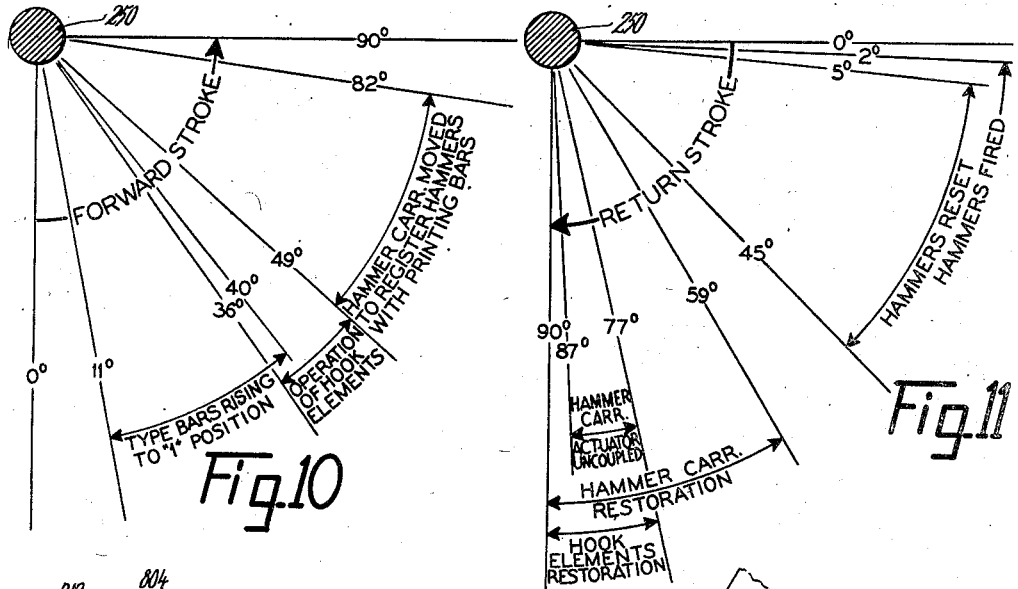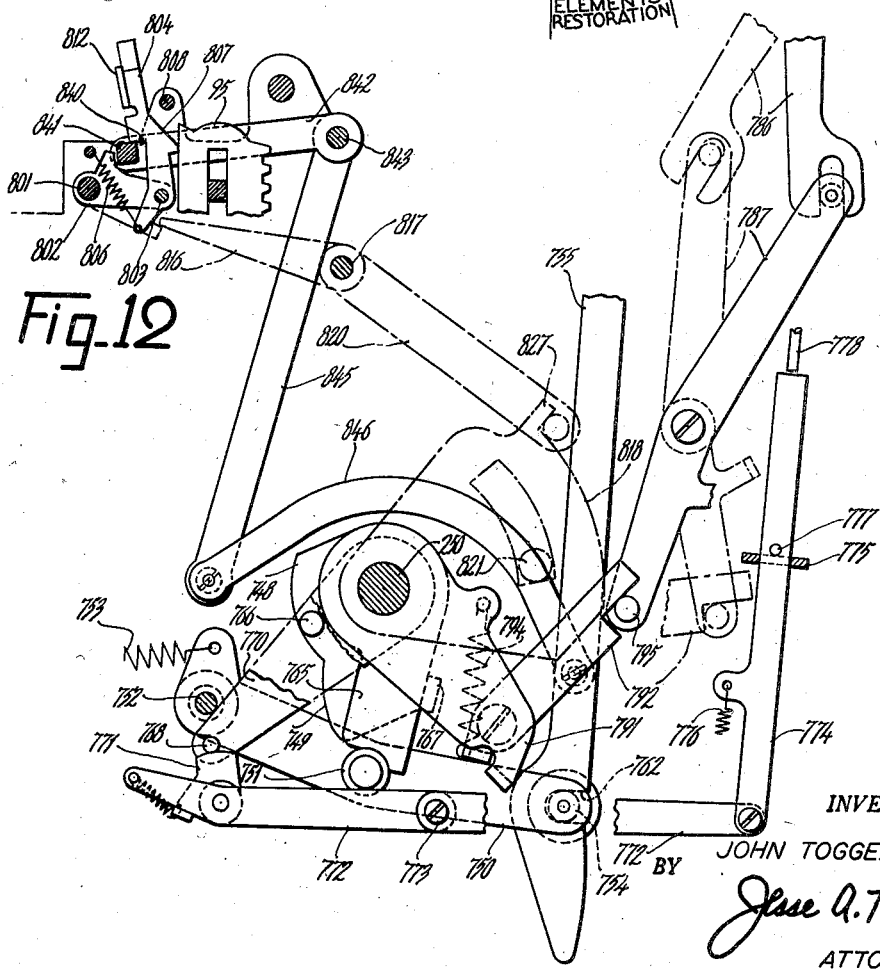

Dec. 31, 1957  J. TOGGENBURGER  2,818,017
COMBINED TYPEWRITER AND PRINTING COMPUTING MACHINE
Filed Aug. 13, 1954  9 Sheets-Sheet 8
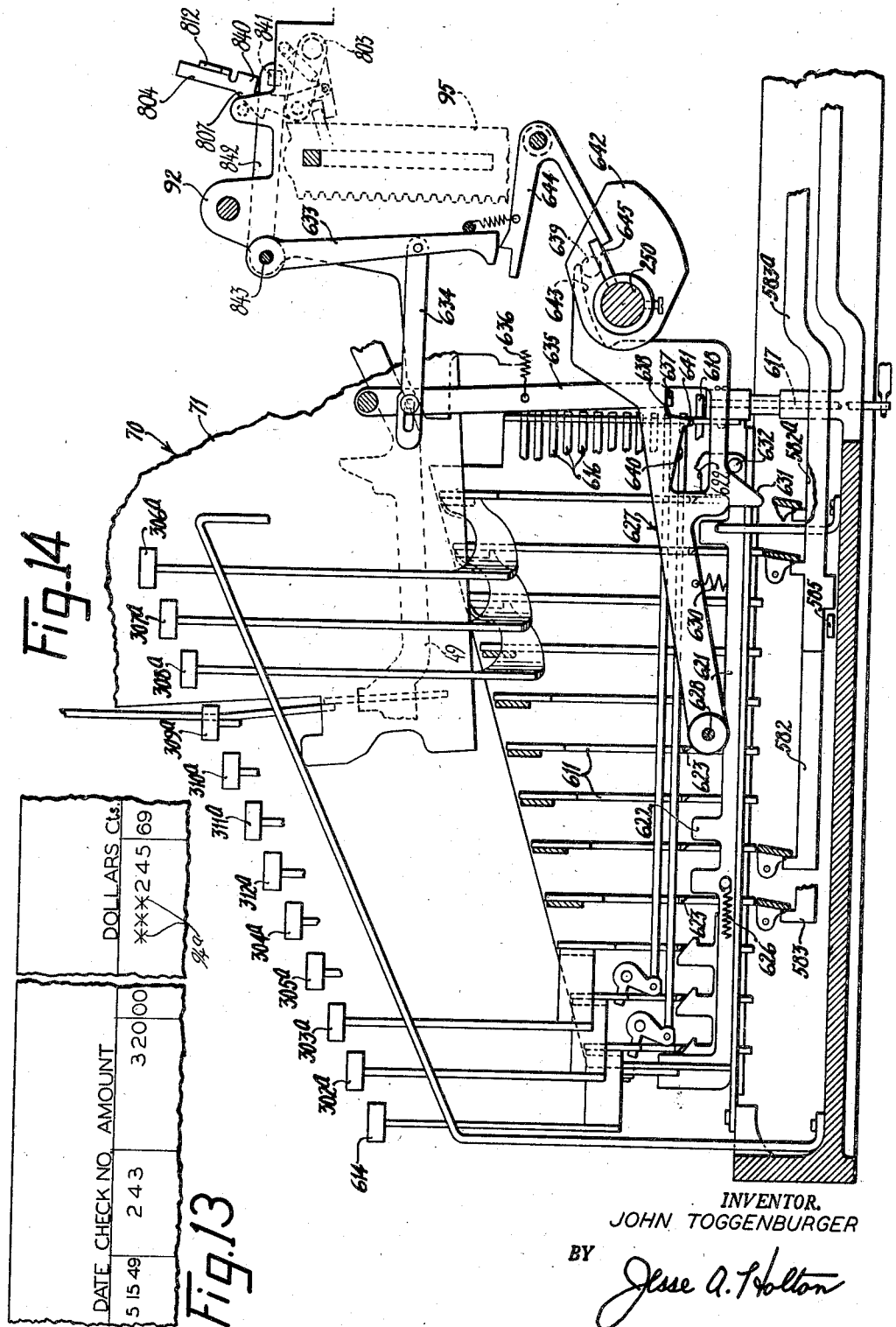
INVENTOR.
JOHN TOGGENBURGER
BY
Jesse A. Holton
ATTORNEY Dec. 31, 1957 J. TOGGENBURGER 2,818,017
COMBINED TYPEWRITER AND PRINTING COMPUTING MACHINE
Filed Aug. 13, 1954 9 Sheets-Sheet 9

INVENTOR
JOHN TOGGENBURGER
BY Jesse A. Holton
ATTORNEY

United States Patent Office 2,818,017
Patented Dec. 31, 1957

2,818,017

COMBINED TYPEWRITER AND PRINTING COMPUTING MACHINE

John Toggenburger, Hartford, Conn., assignor to Underwood Corporation, New York, N. Y., a corporation of Delaware Application August 13, 1954, Serial No. 449,662

25 Claims. (Cl. 101—46)

This invention relates to computing machines in general, and with regard to certain aspects more particularly to that class of computing machines which embody typewriting instrumentalities in addition to a set of computing machine printing members, the arrangement being preferably so that the typewriting instrumentalities will type at a point directly adjacent the set of adding machine printing members. However, it is to be understood that certain phases of the invention are capable of advantageous use without any typewriting mechanism.

The invention may be regarded to constitute an improvement over an application by John Toggenburger, Serial No. 66,441, filed December 21, 1948, now Patent No. 2,686,469, issued August 17, 1954.

In the machine of the stated prior application, a set of adding machine printing bars or members are arranged closely adjacent to one side of a typewriting point. Moreover, the machine of said prior application embodies means arranged above the typewriting instrumentalities, to operate or press the appropriate adding machine printing bars efficiently against a platen. Thus in the machine of the stated prior application, imprints are obtainable from the typewriting facilities and the adding machine printing bars in closely adjacent working zones and without there being any necessity for extensive, time-consuming, distractive and complicated carriage movements.

The machine of the present invention has the same fundamental advantage and it is a general object of the present invention to improve upon the machine of said prior application and particularly also to provide a machine of greater versatility and possible range of practical business applications.

The machine of the present invention embodies in connection with typewriting means a greatly increased number of printing bars of the adding machine species, and such printing bars may comprise several independent groups in neighboring relations of which one or more groups may have computing mechanism associated therewith. Said groups of printing bars may include a specific group for printing identifying data, such as folio numbers, and also a specific group serving to record dates.

The great multiplicity of the printing bars or members makes it impractical to employ the imprint effecting means of said application No. 66,441 which acts on the printing bars seriatim and which for a great number of printing bars would have to be assigned too much time for operation.

It is therefore a major object of the invention to provide for use in the kind of machine stated, an efficient mechanism to actuate the printing bars against the platen, and which mechanism facilitates the relative disposition of a typewriting mechanism and the adding machine printing members so that the carriage positioning movements are held to a minimum.

A more specific object of the invention is to provide in combination with a series of adding machine printing bars which are closely adjacent to a printing point of typewriting facilities, a system of members associated with the printing bars to actuate them efficiently against a printing surface, said actuating members adapted to act on the printing members in rearward direction and being there temporarily in obstructive relation to the typewriting facilities and the machine including means to move said printing bar actuating means collectively and efficiently out of the stated obstructive relation, thereby to permit functioning of the typewriting mechanism.

It is another object of the invention to control efficiently the said printing-bar actuating members so that only such thereof are allowed to function as are related to printing bars which are required to print a digit of significant order.

An object related to the last precedingly noted one is to control the functioning of the individual printing bar actuating members efficiently, and preferably by portions of the printing bars reaching above the level of the typewriting instrumentalities behind the typewriting bars.

Moreover, the composite machine of the invention has been devised so that adjoining to the left of a printed amount the insignificant order printing bars will print protective signs such as stars, thereby forestalling the possibility of fraudulent raising of the amounts printed.

It is therefore also a general object of the invention to provide efficient and simple means to print protective marks to the left of the highest significant order digit printed by a group of printing bars, and particularly to do this efficiently in a machine which comprises printing bar actuators which, in order to make room for the operation of typewriting instrumentalities, are moved temporarily out of an obstructive relation with said instrumentalities.

An adjunct object or feature to the precedingly noted one is to provide efficiently for the printing of protective signs leftwardly of the printed significant figure to variable ordinal position.

Other objects and features will be in part obvious and in part pointed out particularly as the following description of the invention proceeds.

The machine of the invention embodies to a large degree mechanism of the Sundstrand Class C accounting machine, as generally exemplified in the patent to Sundstrand No. 2,194,270, dated March 19, 1940, to which reference may be had for a better understanding of various ramifications of the invention, and in some respects reference to the stated application No. 66,441 may also be helpful and particularly in regard to the typewriting mechanism.

Figure 1A:
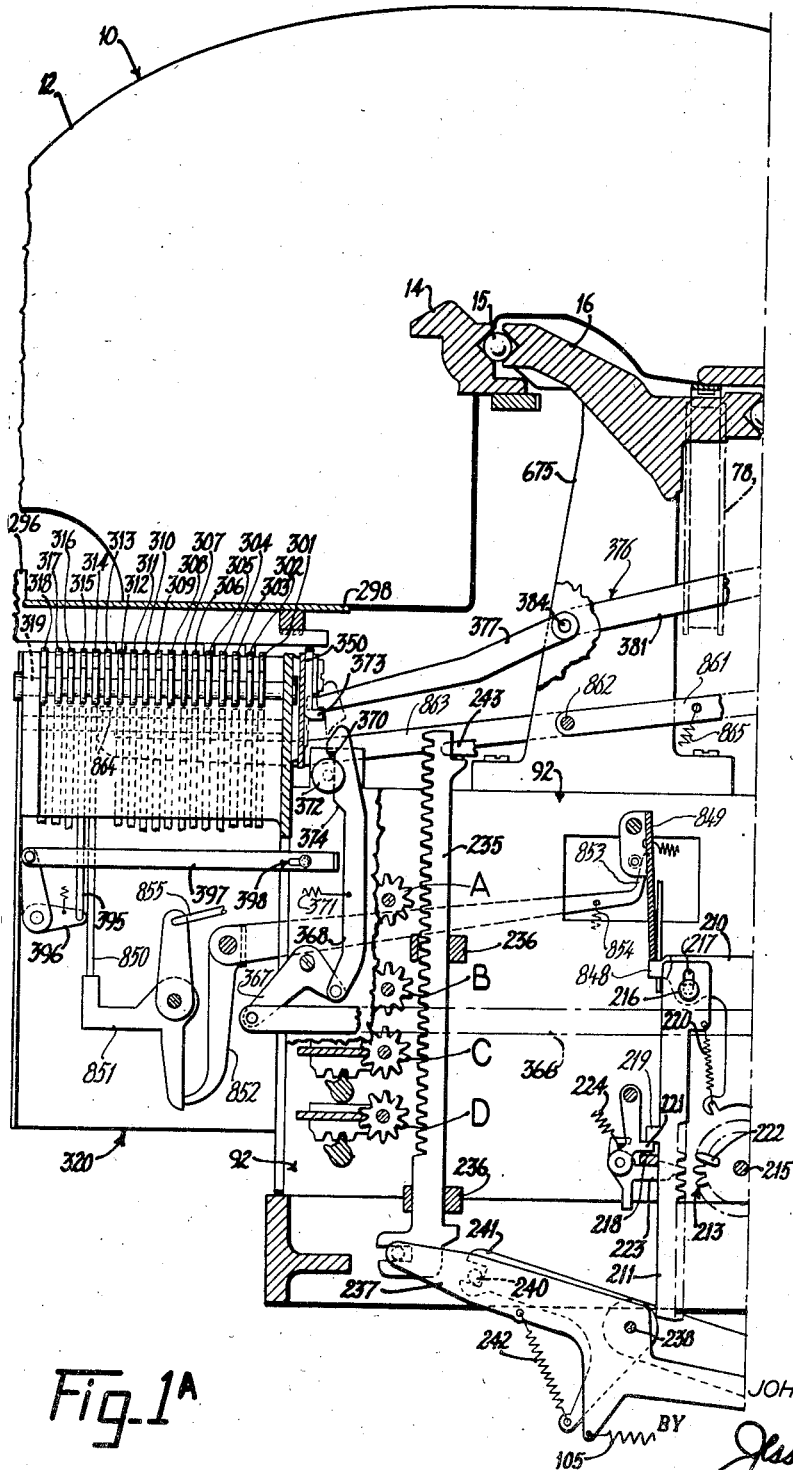
Figure 7:
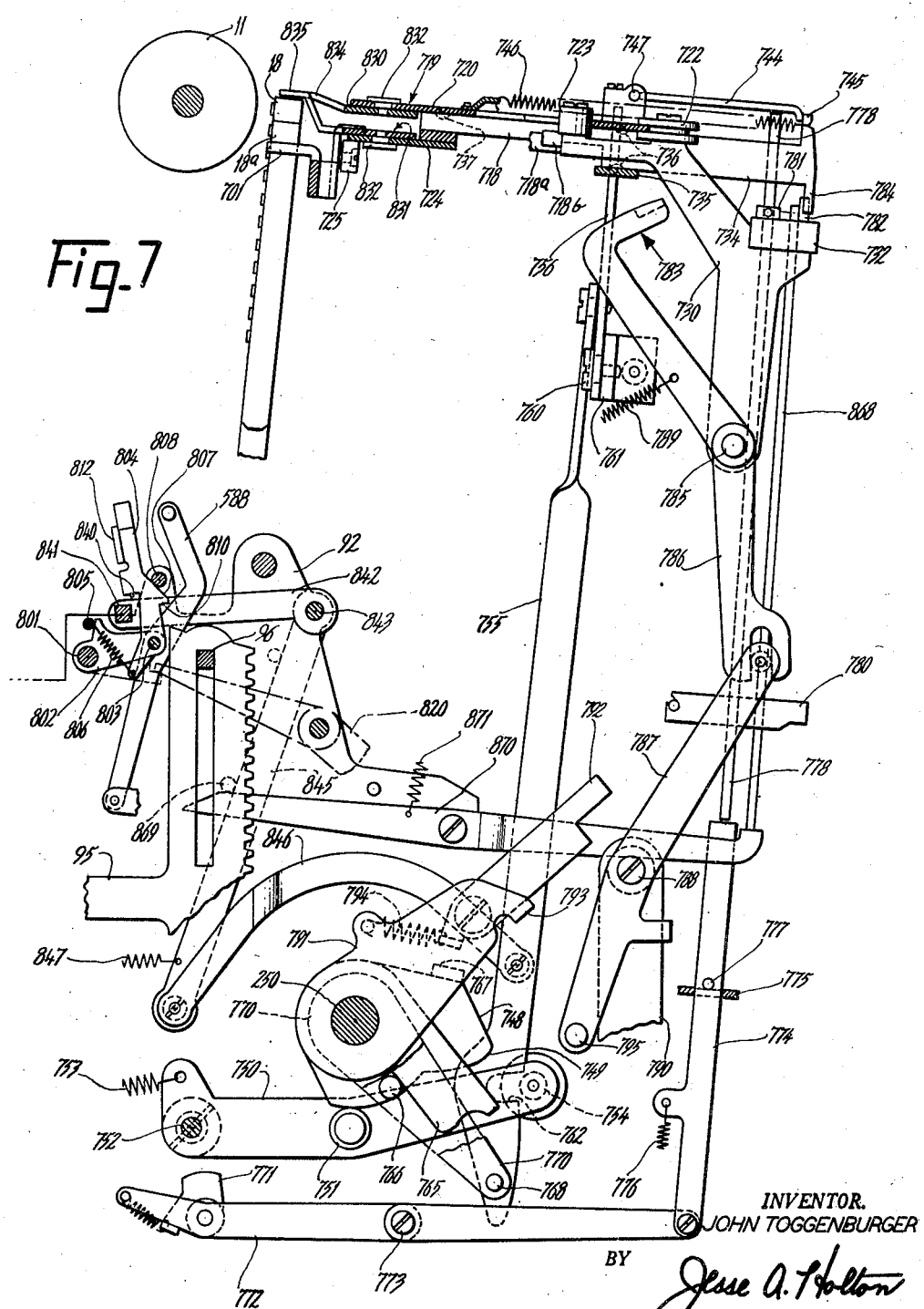
Figure 15:
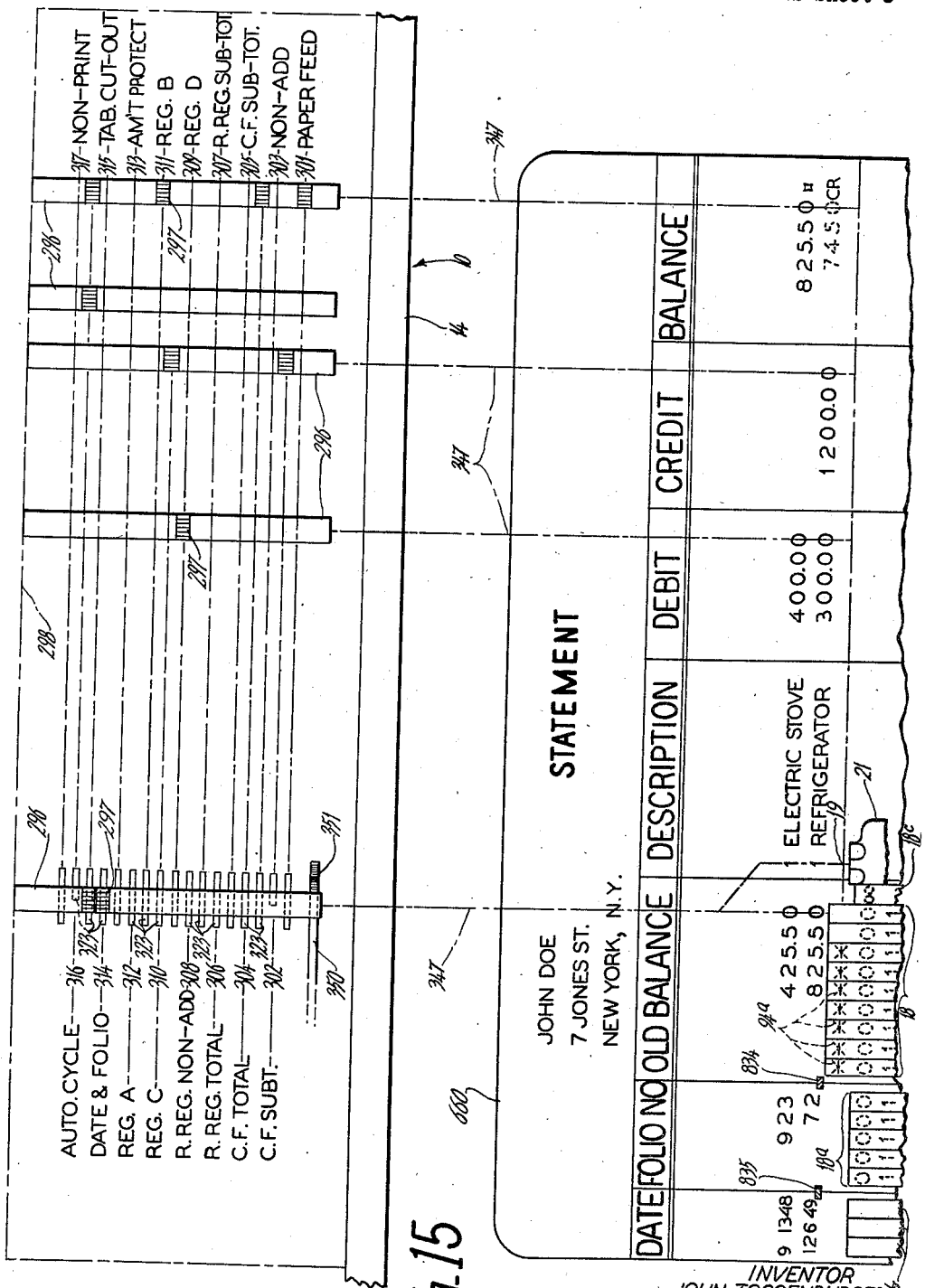

Referring now to the drawings:

Figures 1 and 1A, matched along the vertical dot-and-dash lines in each of these figures, constitute a sectional left-hand side elevation of applicant's composite typewriting and printing computing machine, embodying a hammer mechanism for a series of printing bars which is movable laterally from an idle to an operative position, Figure 2 is a sectional front elevation showing mainly a typewriter type-bar segment, a related type guide and, to one side of the type guide, several printing bar groups having associated therewith the stated hammer mechanism, Figure 3 is a plan view generally of the mechanism seen in Figure 2, Figure 4 is a sectional front view of the hammer mechanism taken along lines 4—4 of Figure 3, Figure 5 is a sectional view similar to Figure 4, but taken along lines 5—5 of Figure 3, Figure 6 is a fragmentary front view illustrating a device operative under carriage control to predetermine in connection with amount entries in a certain column the printing of protective marks to the left of such amounts, Figure 7 is a fragmentary left-hand side elevation depicting in normal position certain cycle controlled mechanisms associated with the manner mechanism of the invention, Figure 8 is a plan view similar to Figure 3, illustrating the printing-bar hammer-mechanism in operation, Figure 9 is a left-hand side elevation of a simplified form of the invention devised for work applications which do not call for protective marks at the left of amounts typed, Figure 9A is a fragmentary side view of an amount printing bar of modified form, Figures 10 and 11 are diagrammatic views showing respectively the timing of certain operations in two successive half cycles of the machine, Figure 12 is a fragmentary left-hand sectional view depicting certain controlling devices for the stated hammer mechanism in the half cycle position of the machine, Figure 13 illustrates a fragment of a work-sheet prepared on the machine, Figure 14 is a fragmentary right-hand side elevation showing certain function control keys and showing additionally a blank-cycle enforcing mechanism, Figure 15 is a representation of a work-sheet, together with different groups of printing bars, the typewriter type guide, and a diagrammatic representation of control dogs serving to cause required operations to take place automatically under the control of a work-sheet supporting carriage.

The machine of the invention is hereinafter described in detail under the following captions:

1. Work sheet supporting carriage
2. Arrangement of typewriting mechanism and printing bars
3. Letter feed mechanism for work-sheet supporting carriage
4. Differential control mechanism for amount printing bars
5. Crossfooter and operating means therefor
6. Rear registers
7. Machine cycling means
8. Cycle and other function controls by carriage and keys
9. Carriage tabulating and returning mechanism
10. Differential control mechanism for folio, date and signal printing bars
11. Hammer mechanism for the printing bars
12. Amount printing bar lowering mechanism for protective sign printing also zero total
13. Operation of appropriate printing hammers 18 and 18a
14. Hammer carriage operation only in printing cycles
15. Carriage control for date and folio number printing
16. Carriage control for protective sign printing
17. Function signal printing control
18. Blank cycle enforcing mechanism
19. Work example of Figure 15
20. Work example of Figure 13
21. Modifications illustrated in Figures 9 and 9A
22. Conclusion

1. *Work-sheet supporting carriage*

In Figures 1 and 1A, the numeral 10 designates a work-sheet supporting carriage having mounted between two spaced ends 12, a platen 11 for backing one or more work-sheets to receive imprints. The carriage comprises ways 13 and 14 guided on a stationary rail structure 16 through the medium of anti-friction elements 15.

2. *Arrangement of typewriting mechanism and printing bars*

The carriage 10 with its platen 11 is common to a set of typewriter type bars 17 adapted to type at a common typewriting point 19, and numerous printing bars 18, 18a, 18b, and 18c, of the kind conventionally employed in printing, adding, or computing machines, each of said printing bars having a vertical row of types thereon facing toward the platen. The printing bars 18 and 18a comprise two adjacently arranged sets capable to print amounts or numbers concomitantly in adjacent work columns. The bars 18 are juxtaposed and in the embodiment of the invention illustrated have adding machine mechanism associated therewith to print amounts involved in computations, whereas the printing bars 18a, which are also juxtaposed, have no computing mechanism associated therewith and serve merely to print numbers, such as folio or parts numbers. However, it is to be understood that in certain business applications, it may be desirable to have adding mechanism associated also with the printing bars 18a. The printing bars 18b are situated as a group to the left of the folio printing bars 18a and serve to print dates. Immediately to the right of the set of bars 18 the machine includes a signal printing bar, 18c serving in conjunction with certain machine operations to make specific operation-identifying impressions. Generally, the stated printing bars 18, 18a, 18b, and 18c serve the same purposes as the various printing bars of the aforestated patent to Sundstrand and are differentially elevatable to effect imprints at a printing line 19a, embracing the typewriting point 19, see Figure 15.

The typewriter type bars 17 are arranged in an arcuate array on a segment 20, swingable in convergent planes from diversive positions of rest in front of and below the printing line to type at the stated typewriting point 19. The printing bars 18, 18a, 18b, and 18c, on the other hand, stand parallel to each other and as a composite group are preferably disposed closely to the left side of the typewriting point 19, as seen in the drawings. The segment 20 carries thereon, raising from the rear side thereof, a type guide 21 to direct the typewriter bars 17 in their final approach to the platen accurately to the typewriting point 19, each type bar 17 having a lip 24, see Figure 1, for guiding entrance in the notch of the type guide 21.

The typewriter type bars 17 are generally of conventional design and the supporting segment 20 therefore is sufficiently forwardly of the platen to afford adequate operating space for the printing bars 18 etc. between the segment 20 and the platen. Because the segment 20, with respect to the platen, has a more forward location than is usual in conventional typewriters, the type bearing heads 23 are provided on the type bars more pronouncedly projecting toward the platen.

The said type bars 17 are operable against the platen 11 under control of type keys 50 and the mechanism for such purpose may be the same as in the stated patent application Serial No. 66,441. Namely, operatively in train with each type bar 17 is an actuator 43 which under the influence of a spring 44 stands normally free of a power-roll 47, the latter being continuously rotating in the direction of the arrow indicated in Figure 1. Each actuator 43 is transistorily engageable with the power-roll 47 by depression of one of the type keys 50, the latter provided on levers 49 having hook elements 53 to draw the actuators 43 into engaged relation with said power-roll 47. Any engaged actuator receives a transitory power stroke from said roll 47 which is transmitted to an upright lever 37. Each of said levers 37, by a link 38, has a connection with another lever or bell crank 32 which is communicative through a link 33 with a type bar 17 related thereto. The bell cranks 32 are generally in a common plane with their individually related type bars 17. They are supported in an arcuate array on a case-shiftable frame 63 whereon also the segment 20 is carried. On the other hand the levers 37, are arranged to pivot about a straight transverse pivot rod 36 and are upreaching therefrom to graded extents congruent with the disposition of the related bell cranks 32. The direction of the case-shiftable frame 63 is indicated in Figure 1 by the showing of a ball and raceway at 66, it being noted that the case-shift is substantially in the plane in which the printing bars 18 etc. are differentially movable. As each type bar 17 following the engagement of its actuator 43 is operated toward the platen, the actuator becomes disconnected by caming engagement with a conventional abutment bar 67, the printing movement of the type bar 17 being concluded under the power of momentum. After the typing impact the operated type bar and mechanism linked thereto return under spring bias to normal position.

The typewriting mechanism just described is supported within a typewriter frame generally designated by the numeral 70 which comprises two spaced side walls 71 rigidly connected by a series of cross members including a bar 52 which supports a pivot rod for the key levers 49. Under control of conventional case-shift means, not shown, the case-shift frame or body 63 may be caused to occupy either a lower or an upper case position so that at operation of the type bars 17, typing of either lower case or upper case characters will be effected.

Referring now more particularly to Figures 1 and 15, the printing bars 18, 18a, 18b, and 18c are light-weight in structure and each has along its rear side a vertical row of types 94. All the printing bars 18 and 18a have digit types "0" to "9" thereon, the "9" types being lowermost. The "0" types of all such printing bars stand normally below the printing line 19a, indicated in Figure 15 by a dot-and-dash line. Preferably, the printing bars 18 are upreaching one increment above the printing bars 18a, 18b, and 18c, and all, except those of the cents orders, carry a protective sign type 94a simulating a star. Although the printing bars 18 reach above the printing line 19a, vision to the printing line is not obstructed thereby because such bars are normally tilted away from the platen. The other printing bars 18a, 18b, and 18c have no star type 94a and stand normally fully below the printing line 19a, as is clearly evident from Figure 15. The printing bars 18 and 18c are normally contiguous to each other at least down to their lowermost types 94 and are laterally confined as a group between the left side of the type guide 21 and a guide finger 700 comprised by a bracket 701 which reaches inwardly from the left side wall 71 of the typewriting machine and may be integral therewith. The printing bars 18a are also contiguous to each other and as a group are confined between the guide finger 700 and another guide finger 702. To the left of the guide finger 702 there are the three date printing bars 18b confined between the finger 702 and another finger 703. The printing bars 18 etc., lean normally away from the platen against the rear side of segment 20, as seen in Figure 1.

3. *Letter feed mechanism for work-sheet supporting carriage*

Referring to Figure 1, the carriage 10 has supported thereon a letter-feed rack 72. An escapement wheel having support on the framework of the machine carries a pinion 74 with which the rack 72 is normally in mesh. The rack 72 has teeth at letter-feed intervals and is releasable from the pinion 74 for quickly repositioning the carriage, as is clearly brought out in the said key copending application No. 66,441. A carriage feed spring 78, see Figure 1A, urges the carriage constantly in letter-feed direction but an escapement 80, associated with the escapement wheel 73, exercises control over the carriage to hold it normally in the prevailing letter-feed position. Said escapement 80 is of conventional design and is rockable by the operation of any type action to cause the carriage to execute one letter-feed step under the urge of the carriage spring 78. Specificaly, each bell crank 32 is adapted to operate an arcuate universal bar 81 forwardly, such universal bar 81 including two rearwardly reaching bars 82 which are articulated to and carried on a rocker frame 83 having a link connection with the escapement 80. The universal bar 81 and the parts leading to and including the escapement 80 are spring restored. It will be seen that each power operation of a type bar 17 will be accompanied by a transitory operation of the escapement 80, and that consequently, the carriage will execute a letter-feeding step following each typing impression made by any of the type bars 17.

4. *Differential control mechanism for amount printing bars*

Each printing bar 18 may be caused to raise differentially under control of adding machine mechanism which in its major respects is identical with the conventionally marketed Sundstrand Class C accounting machine of said Patent No. 2,194,270. Specifically, there are for the various printing bars 18 individual differential actuators 95, all guided for vertical movement, at the top by a bar 96, and at a lower level by a bar 97, both these bars being notched in a usual manner to space said actuators 95 laterally. The notched bars 96 and 97 extend between and are carried fast on two spaced frame members 92 of the framework. The printing bars 18 are of reduced thickness below the types 94 to intersperse them with the differential actuators 95, each printing bar 18 having its associated actuator closely to the right thereof. Motion is transmitted from each differential actuator 95 to its related printing bar by motion multiplying means, preferably comprising, a relatively large gear 98 in mesh with a gear rack 100 provided on the lower portion of the printing bar 18, and a smaller gear or pinion 101 in mesh with a rack formed on the differential actuator 95, the two gears 98, 101 being united for rotation together. The pairs of gears 98 and 101 are all turnably supported in a straight row on a fixed supporting rod 99.

Due to the provision of the gears 98 and 101, the movements of the printing bars 18 are greater than the movements of the differential actuators 95, wherefore the types 94 are spaced far enough apart along the bars 18 to give clear individual impressions when hammered rearwardly into printing engagement with the platen 11.

The various actuators 95 have each an individual lifting lever 104 associated therewith, as shown in Figures 1 and 1A, each such lever being under constant tension of a lifting spring 105. However, in the normal condition of the machine a universal bar 106 overlies these levers 104 so that all the actuators 95 normally occupy their lowermost positions as seen in Figure 1, and correspondingly the printing bars 18 have the "0" types thereon one unit space below the writing line and are positioned as in Figures 1, 2, 7, and 15. The machine embodies cycling mechanism similar to the machine of said application No. 66,441, and during each machine cycle the universal bar 106 rises, enabling the springs 105 to lift the various actuators 95 in accord with an item entry that is being made, or in accord with a total that is contained in a register, as will henceforth become clear.

An amount indexing mechanism is generally designated by the numeral 107 in Figure 1 and, dependent on the amount indexed therein, it controls the differential raise of the actuators 95. Said indexing mechanism includes a conventional bed of stops, comprising a plurality of adjacent vertical rows of index pins 108, each such row containing 10 pins representing digit values from "0" to "9," and there being as many adjacent rows of pins 108 as there are actuators 95.

At the rear of the bed of pins 108 there are arranged in a transversely movable carriage 111 a series of adjacent tail pins 112, severally slidable in vertical perforations of the said carriage. Normally, said carriage 111 is located with the rightmost pin 112 a short space leftwardly of the bed of pins 108. Each tail pin 112 has extending through a perforation at the bottom thereof a forward extension 113 of one of the actuators 95, the various extensions 113 having hinged association with their related actuators in a conventional manner. The tail pin carriage 111 constitutes a denomination shifting carriage and is slidable, supported on a rod 115.

Progressively beginning with the leftmost row, index pins 108 are set in accordance with the digit values to be printed and/or computed. To this end there is articulated with the denomination shifting carriage 111, as at 117, an arm 118 that is adapted to swing horizontally on a vertical pin 120. Said arm 118 carries an upright post 119 near its swinging end, and through this post there extend a series of push rods 121 arranged in a vertical row. These rods 121 are adapted to swing along with the arm 118, progressively, from left to right, into operative alignment with the several rows of stop pins 108. The rods 121 are operable by spring restored arms 123 which have pivotal connections therewith substantially in line with the pivot pin 120 for the arm 118, said arms 123 being variously supported for operation on the frame in a manner not shown but well known. At the outset of each amount indexing operation, the push rods 121 are in registration with the leftmost vertical row of index pins 108. Upon operation of an appropriate arm 123 as called for by the highest order significant digit, the appropriate stop pin 108 becomes projected and upon further successive operations of appropriate arms 123, other stop pins 108 become progressively projected in the more rightward rows. This is the case because incidental to each operation of an arm 123 an escapement 173 related to the denominational shifting carriage 111 is automatically operated in a conventional manner, not shown, and the tail pin carriage, as well as the push rods 121, advance rightwardly a step under the urge of a spring, not shown. The arms 123 are selectively operable under control of a ten-key numeral keyboard which may be situated laterally to one side of the keyboard embodying the typewriter keys 50. This ten-key keyboard and related mechanism controlling the arms 123 is not shown, but may be of a type generally disclosed in the patent to Stickney No. 1,971,239, dated August 21, 1934. In a fundamental sense, the described amount indexing mechanism is the same as in the stated patent to Sundstrand No. 2,194,270.

A usual device, not shown, is provided at the left of the bed of index pins 108, serving in all item entry cycles to restrict the rise of those actuators 95 to "0" position which have their tail pins 112 to the left of the bed of pins 108. This device is incapacitated during total printing cycles, in a usual manner.

5. Crossfooter and operating means therefor

The differential actuators 95 have each a rearward extension 210, to each of which there is connected an adding rack 211 and a subtracting rack 212. A crossfooter register 213, comprising pinions 214 on a transverse shaft 215, is arranged between the racks 211 and 212, and is adapted to be shifted horizontally into mesh with either the adding or the subtracting racks, in the same manner as in the said patent to Sundstrand No. 2,194,270. The racks 211 and 212 are attached to the actuator branches 210 by means of mounting studs 216 that are fast on said branches and reach through short vertical slots 217 in said racks. At the level of the crossfooter, in a usual manner, the racks 211 and 212 are guided in vertical slots provided on transverse bars 218. Contractile springs 220 associated with the racks, and anchored to downward reaches of the actuator branches 210, facilitated by the slots 217, permit, by means to be described, the arrest of the racks 211, 212, during their downward movement at the end of any machine cycle, one unit movement before the actuators 95. However, whenever a register wheel 214 is to receive a ten's transfer movement, the rack 211 or 212 in mesh therewith is allowed to move with its associated actuator 95 the full distance, that is one unit movement in excess of the digit value to be printed, it being understood that the total return or downward movement of the differential actuators 95 is always the equivalent of one unit movement in excess of an indexed digit or a digit to be total printed.

During an item entry cycle in which the crossfooter 213 is active, the crossfooter is shifted automatically forwardly or rearwardly, as required, at the beginning of the second half cycle of the machine, to cause the racks 211, 212 during their subsequent descent to drive the crossfooter 213 either additively or subtractively. The means by which the racks 211, 212 are arrestable after a descent corresponding to the indexed number comprise pawls 221 engageable by lugs 219 on the racks. Whenever a register wheel 214 is to receive a units transfer from the wheel of the next lower order, a units transfer tooth 222 on such lower order wheel will trip a transfer control element 223 free from an edge of the bar 218 where it is normally held. These elements 223 are pivotally carried on the pawls 221, and springs 224 keep them normally latched. Upon the freeing of any element 223, it will, under the tension of a spring 224, move the associated pawl 221 out of blocking position. In each instance where this occurs, the active rack 211 or 212 is permitted to descend the full distance with the associated differential actuator 95, and will move the register wheel the equivalent of the indexed digit value plus a carry unit. In all instances where there is to be no carrying operation, the pawl 221 will remain in place under the rack lug 219 and will arrest the rack 211 or 212, the actuator 95 however being permitted by the spring 220 to move one step lower.

6. Rear registers

As in said Sundstrand Patent No. 2,194,270, the present machine is shown to include four rear registers, designated A, B, C, and D, arranged vertically above each other and capable of addition and total taking action, see Figure 1A. These rear registers are adapted to be engaged only one at a time inasmuch as a single set of drive racks 235 are common to all. Said drive racks are all adapted to execute an extra unit step for effecting ordinal transfers similar to the crossfooter racks 211, 212. The racks 235 are mounted for vertical movement in transverse guide bars 236. At their lower ends the various racks 235 have articulations with arms 237 that are pivotally mounted on a rod 238 which constitutes also a fulcrum for the lifter arms 104 of the type bar actuators 95. Each of the arms 237 has a lost motion connection 240 with an arm 241 that constitutes together with the actuator lifter arm 104, a lever, said lost motion connection affording capacity for a one unit yield between the arm 237 and the arm 241. When the type bar actuators 95 move upwardly the racks 235 move downwardly. Springs 242 arranged intermediate the arms 241 and 237 permit the register driving racks 235 in their upward return movements to be arrested the equivalent of one unit movement ahead of the return movements type bar actuators 95. The usual units transfer control mechanism is provided, which includes stop members 243 associated with the racks to suppress individually the last unit return movement of the racks 235 at all times except whenever a units transfer is to be received, the stop members being appropriately controlled for the purpose by transfer control teeth on the wheels of the active register A, or B, or C, or D, in a manner not shown.

The registers A, B, C, and D are selectively shiftable forwardly into mesh with the racks 235 in a usual manner, under carriage control, as well as under key control, some of the primary elements for such control being pointed out later.

7. Machine cycling means

The machine cycling means includes a rock shaft 250, see Figures 1, 2, 3, 7, 10 and 11, which, as viewed in connection with Figure 1, receives in each cycle first a clockwise, then an anti-clockwise rocking motion, each of 90°. For imparting such reverse rocking motions to the shaft, the machine includes a mechanism fully disclosed in the said patent to Sundstrand and which is adapted to be called into operation by depression of a cycle key, not shown, or automatically under carriage control.

Referring to Figure 1, the rock shaft 250 carries two spaced members 271 having each a cam roller 272 in controlling communication with a forked arm 273, the latter being pivotally carried on the same rod 238 which also pivotally supports the lift arms 104 of the actuators 95. These forked arms 273 support the rod 106 which overlies normally the lifting arms 104 for the actuators 95. In the normal condition of the machine, as seen in Figure 1, the forked arms 273 are held in their lowermost positions by the rollers 272. In each machine cycle after some initial rearward rocking motion is imparted to the members 271, the rollers 272 are operative on said forked arms to elevate said rod 106, whereby said actuators 95 are permitted to be spring lifted by the lifter arms 104, either in accordance with the prevailing condition in the bed of index pins 108, or in accordance with a total to be taken from the crossfooter 213 or one of the rear registers A, B, C or D. It is understood that the forked arms 273 rise sufficiently to allow the printing bars 18 to rise to their highest possible digit positions. The forks in the arms 273 are designed so that the latter receive their up and down motions respectively over the mid-phases of the reverse rocking motions of the rock shaft 250. Always during the return rocking stroke of the shaft 250 the forked arms 273 are forced downwardly to place the actuators 95 in their lowermost, normal positions as viewed in Figure 1.

8. Cycle and other function controls by carriage and keys

The machine of the invention has function control dogs 296 attachable to a plate 298 on the carriage in desired positions, see Figures 1A and 15. These dogs are generally of the design disclosed in said Sundstrand Patent No. 2,194,270, and, by means of appropriately located tappets 297 projecting downwardly therefrom, are adapted to operate, by the movement of the carriage to certain positions, any one of a number of underlying, frame-supported, function selectors which are designated by the numerals 301 to 318, inclusive. All these tappets but those numbered 313, 314 and 315 serve for conventional purposes.

A series of function control keys 302a to 312a, inclusive, and 614, are provided at the right of the typewriter keys 50, see Figure 14, for conditioning the machine manually for certain operations.

Said selectors and function control keys serve to condition the machine for the following functions:

| Selector | Key | |
|---|---|---|
| 301 | | Paper feed. |
| 302 | 302a | Subtraction in crossfooter. |
| 303 | 303a | Non-add in crossfooter. |
| 304 | 304a | Total in crossfooter. |
| 305 | 305a | Sub-total in crossfooter. |
| 306 | 306a | Total in selected rear register. |
| 307 | 307a | Sub-total in selected rear register. |
| 308 | 308a | Non-adding selected rear register. |
| 309 | 309a | Register D. |
| 310 | 310a | Register C. |
| 311 | 311a | Register B. |
| 312 | 312a | Register A. |
| 313 | | Check protection. |
| 314 | | Date and folio printing. |
| 315 | | Tabulation cut-out. |
| 316 | | Automatic cycle. |
| 317 | | Non-print. |
| 614 | | Credit Balance. |

The various functions selectors 301 to 318, inclusive, see Figure 1A, comprise levers, all pivoted at their left ends on a rod 319 supported in a selector housing 320. These levers or selectors include thereon either a one-way or a two-way acting cam element 323, see Figure 15, for camming engagement during carriage advance by related overlying tappets 297 on the control dogs 296, such engagement resulting in downward actuation of the selectors about said pivot rod 319. So far as it is thought necessary for an understanding of the invention, more will be said about some of these selectors as the description proceeds.

9. Carriage tabulating and returning mechanism

In order that the letter-feed mechanism for the carriage 10 may be in readiness to serve whenever the typing instrumentalities are operated, a tabulating mechanism is provided which normally is not in control over the carriage, and which after being called into operation and after functioning will restore automatically the carriage to the control of the letter-feed mechanism. This mechanism is fully described in copending application No. 66,441 and comprises a tabulator stop lever 350 having a stop nose 351 normally below the path of travel of the function control dogs 296. The carriage feed rack 72 is normally in mesh with the escapement pinion 74, so that the carriage is normally held stationary under control of the letter-feed escapement 80.

Cycle-actuated means is provided to rock the tabulator stop lever 350 automatically to a position wherein its stop nose 351 will lie in intercepting range of the function control dog 296 which is next to the right thereof. This means is cycle-actuated during the return rocking motion of the cycle shaft 250, and, see Figures 1 and 1A, comprises an arm 364 rigidly associated with the cycle shaft 250 and having a link 366 reaching horizontally to the rear thereof. The rear of this link 366 is connected with a bell crank 367, having a stationary pivot, and having upwardly extending therefrom a link 368 formed with a hook 370. A light spring 371 biases the link 368 to bear rearwardly against a stud 372. Normally the hook 370 is positioned below and in front of a ledge 373 on the tabulation stop lever 350. During the first half of the machine cycle when the rock shaft 250 turns clockwise as seen from the left side of the machine, the hook link 368 will rise until its hook end snags over the ledge 373. This is indicated in dot and dash lines in Figure 1A. During the second half cycle when the shaft 250 rotates back to normal position, the hook 370 will pull down the left end of the tabulator stop lever 350, wherefore the other end will rise into carriage intercepting range of the control dog 296 which is situated to the right thereof. Near the end of the return stroke of the cycle, the hook link 368 will be displaced forwardly by engagement of a cam face 374 thereon with the stud 372. However, means are provided which automatically function to maintain the tabulator stop lever 350 in operated position until its nose 351 intercepts the control dog 296 and thereby halts the carriage. For this means and other particulars reference may be had to said application No. 66,441.

Incidental to each operation of the tabulator stop lever 350, the carriage is freed for tabulating movement by the carriage feed spring 78. This is done through a lever 376 pivoted at 384 and comprised of an arm 377 reaching into a slot of the tabulator lever 350, and another arm 381 having a roller 382 underlying a bottom face of the carriage feed rack 72. Except when a tabulation is in progress, the roller 382 is at an elevation to cause the rack 72 to be in mesh with the escapement pinion 74. Incidental to the operation of the tabulator lever 350, the roller 382 will be elevated and will lift the rack 72 free of the pinion 74, the carriage being then drawn to the left by its feed motor 78. Responsive to the tabulator lever 350 being engaged by the control dog 296 running thereagainst it is caused to swing free thereof and the lever 376 restores, allowing the carriage feed rack 72 to drop to normal position, wherefore the control of the escapement 74 over the carriage is reestablished.

It is desired that in certain computing columns the cycling operation will have no effect on the tabulating mechanism. This is the case, for example, where a typewriting column is required to be very closely to the right of a computing column. Toward accomplishing this end, the aforesaid selector 315 is provided for operation by a tappet 297 on any dog 296 defining a computing column from which no cycle instituted tabulating movement is desired. The selector 315 has its swinging end overlying a vertical rod 395 connected by a bell crank 396 to a forwardly extending push link 397 being horizontally guided at its forward end by a pin and slot provision 398. From Figure 1A, it will be seen that said link 397 stands normally well to the rear of the hook link 368 and has no controlling influence thereover. However, when a tappet 297 operates the selector 315, the said push link displaces the said hook link 368 forwardly about its pivotal association with the bell crank 367, so that its hook 370 during cycling operation of the machine will take a path forwardly of and clear of the ledge 373 on the tabulator lever. Therefore, in any columnar position wherein it is desired that cycling of the machine have no tabulating effect, it is merely required that the control dog 296 defining such position be equipped with a tappet 297 for operativeness on the selector 315. Thus, the described tabulation suppressing feature permits an operator to typewrite closely to the right of a posted or total printed amount.

For tabulating the carriage at will, a tabulator key, not shown, may be provided to operate the tabulator lever 350.

10. Differential control mechanism for folio, date and signal printing bars

Actuators 95 are associated with the folio printing bars 18a, the date printing bars 18b, and the signal printing bar 18c, in substantially the same manner as such actuators are provided for the adding machine printing bars 18. These actuators 95 for the printing bars 18a, 18b and 18c have no adding and subtracting racks associated therewith and like the other actuators 95 are under the constant upward bias of levers 104 which, however, are normally held down by the universal bar 106, all as generally disclosed in the stated patent to Sundstrand.

In conjunction with the actuators 95 for the folio printing bars 18a, there is provided an indexing mechanism, not shown, which is substantially the same as the aforedescribed indexing mechanism 107 inclusive the ten-key keyboard therefor.

The actuators 95 for the date printing bars 18b have associated therewith three rows of stop pins, along with key-controls therefor, not shown, but fully disclosed in said patent to Sundstrand.

Referring to Figure 14, the extent of rise of the signal printing bar 18c is governed in each cycle by a row of normally withdrawn stop pins 616 and a normally effective stop pin 618, such pins being differentially controlled by keys 302a etc., and operation of any of these keys projecting a particular one of the pins 616 and withdrawing at the same time the normally effective pin 618. Whenever a stop pin 616 has been set and a machine cycle occurs, a tail pin 617 associated with the signal bar actuator, will determine the extent of rise for the latter by movement upwardly against the set pin.

11. Hammer mechanism for the printing bars

Referring particularly to Figures 1, 2, 3 and 8, each of the printing bars 18, 18a, 18b, and 18c has its own individual hammer related thereto. The amount printing bars 18 have each a hammer 718 related thereto. For every one of the folio printing bars 18a there is a hammer 718a. The date printing bars 18b have each an individual hammer 718b, and for the signal printing bar 18c there is provided a hammer 718c. The said hammers are preferably supported on a hammer carriage or slide 719 which is normally in the position seen in Figure 3, locating all of the hammers normally a certain distance leftwardly of their related printing bars and as a composite group a considerable distance leftwardly of the type guide 21. The arrangement is such that the typewriter bars 17 are normally operable without obstruction by the said hammers and supporting mechanism. In Figure 2, a dot-and-dash line 17a indicates the space which must be available for the leftmost type bar 17, and it will be noted that the hammers stand clear to the left. In each printing cycle, the said carriage 719 is moved rightwardly to bring the printing hammers 718, 718a, etc. into lateral registration with their associated printing bars. This is in advance of the printing phase of the cycle at which the appropriate hammers become automatically released, all in a manner to be described.

Normally, all the printing bars 18, 18a, 18b, and 18c, are in their lowermost positions as seen in Figures 1 and 15, because a bail 451 holds them leaning away from the platen and clear of a color ribbon, about their points of associations with the gears 98. Said bail 451 is mounted on a rock shaft 456 having pivotal support in the members 92 of the adding machine framework. Fast on said shaft 456, secured thereto at its left end, there is a forwardly and downwardly reaching cam arm 457 which, under the tension of a spring 460, is urged in clockwise direction to the position seen in Figure 1, to the limit of an abutment, not shown. Differential upward movement of the printing bars is with the bail 451 holding them spaced from the platen 11.

Near the end of the forward stroke of any item or total printing cycle, when the universal bar 106 overlying the lever arms 104 reaches uppermost position and thus the printing bars are elevated, the said cam arm 457 is engaged and displaced by a pin 461 on an arm 365 which is carried fast on the cycling shaft 250. Such engagement results in a rearward rocking motion of the bail 451 and renders all the printing bars free for rearward actuation against the platen by the hammer mechanism described hereinafter.

The printing hammer carriage 719 comprises a substantially flat plate, preferably of sheet metal and having oppositely projecting ways 721. Cooperative with each of said ways 721 is a grooved guide roller 722 and a cylindrical guide roller 723. The said carriage 719 comprises also a guide plate 724 at a slightly lower level than the plate 720. This plate 724 rides near the platen upon a roller 725 carried by the bracket 701, said bracket having an ear 726 reaching from the rear over the plate 724. It will thus be seen that the carriage 719 is guided by the rollers 722, 723, 725 and the said overlying ear 726 in a path parallel to the platen. Normally, under the influence of a spring 727, the carriage 719 occupies a leftward limit position, as in Figure 3, a downwardly bent ear of the rail ways 721, abutting normally leftwardly against a stop pad 728 of laminae. The rollers 722, 723 associated with each way 721 are supported by spaced brackets 730, 731, both of which are secured upon a bar 732 extending transversely of the machine and being secured to the opposite side walls 71 of the typewriter frame.

From Figures 1, 3, 7, and 8 it will be observed that the hammers 718, 718a, 718b, and 718c, are in the form of slides carried parallel to each other on said hammer carriage 719. Having now more particularly reference also to Figures 4 and 5, it will be seen that each of these hammers 718 etc. comprises a slender hammering finger 733 facing toward the platen 11, and comprises further a vertically wider portion 734. It will also be noted that the hammering fingers 733 of the hammers 18 are disposed at a higher level than these fingers of the hammers 18a, and, moreover, that the fingers 733 of the hammers 718b are arranged at a medial level with respect to the fingers 733 of the hammers 718 and 718a. The reason for these differences in the hammers will become evident later herein. All the hammers are guided at their vertically wider portions 734 between the main plate 720 of the hammer carriage and a guide plate 735, such plates 720 and 735 having each a series of laterally spaced protuberances 736 extending toward each other as indicated in Figure 1, thereby to confine and guide the individual hammers in laterally spaced locations. Said series of protuberances 736 may be produced by first forming an elongated ridge where said protuberances are to be provided, and then milling ways across these ridges to form said protuberances. To guide the hammers 718 at the locations of their fingers 733, the top plate 720 has at the lower side thereof a row of protuberances 737 similar to the protuberances 736, the top plate 720 and a filler plate overlying the bottom plate 724 of the carriage confining said fingers vertically. The fingers 733 of the hammers 718a are laterally spaced by protuberances 740 upreaching from the bottom plate 724, and overlying the said fingers and underneath the top plate 720, there is a filler plate 741. The fingers 733 of the hammers 718b are vertically confined between the filler plate 741 and a filler plate 742, the latter having grooves milled therein to provide for the appropriate spacing of the hammers 718b. It will be seen from Figure 4 that the top plate 720, the bottom plate 724, the filler plates 738, 741 and 742, along with a number of spacers are united by rivots 743 into a single structure affording guide ways for the various hammer fingers 733 and it will also be seen that the various hammers 718, 718a, 718b, and 718c are additionally guided on the hammer carriage 719 by the protuberances 736, 737, the hammers being guided for individual operations transversely on the hammer carriage toward the platen.

In the normal condition of the machine, the said hammers are all withdrawn an appreciable distance away from the printing bars 18 etc., as seen in Figures 1 and 3. To this end a latch plate 744, whereagainst upreaching noses 745 of all the hammers normally abut, is instrumental normally to hold all said hammers away from the platen. Individual springs 746 urge said hammers toward the printing bars. The said latch plate 744 is pivotally accommodated for vertical swinging movement on the plate 720 of the hammer carriage, as at 747.

During each machine cycle wherein a printing operation of any of the bars 18, 18a, 18b, 18c is to occur, the said hammer carriage 719 is moved rightwardly in a cycle phase which precedes the printing phase. The movement is to the extent necessary to align the various printing hammers laterally with the individually related printing bars. To this end an element 748 fast on the cycling shaft 250, has a cam 749 for action on a roll 751 to displace an arm 750 downwardly, the latter having pivotal support as at 752 on the framework of the machine and being impositively urged upwardly by a spring 753. Laterally adjacent to the element 748 there is mounted for pivotal movement concentrically on the shaft 250 a radial arm 765, the pivotal movement of which is restricted between a pin 766 and an ear 767, both on said element 748. During an appreciable first-part of the cycle, the said arm 750 remains in the lower, normal position seen in Figure 7, because the roller 751 rides on a dwell preceding the cam 759. In the course of the first half cycle the radial arm 765 encounters the roll 751 and pivots on the shaft 250, and near completion of such half cycle the ear 767 encounters the arm 765, it will cause it to move a final part in unison with the element 748. Actually, when the arm 765 is encountered by the ear 767, then its outer end forms a continuation of the cam 749. When the machine reaches half cycle position, the roller 751 will rest in a slight depression near the outer extremity of the said arm 765, as shown in Figure 12, retaining the arm 750 in fully operated position.

The swinging end of the arm 750 is provided with a headed pin 754 to which there is adapted to be coupled a vertical link 755. The upper end of this link is articulated with a bell-crank 756 which at the level of the hammer carriage 719 has an impositive link connection with such carriage, comprising, a contractile spring 757 and a rod 758 of definite length interposed between the said carriage and the said bell crank. The bell crank 756 is pivotally carried at 760 on a bracket 761 which has support on the right side wall 71 of the typewriter frame.

In each cycle wherein at least one printing bar is required to print the said link 755 is moved into coupled relation with the pin 754 before the cam 749 commences to swing the arm 750 downwardly, it being noted that the said link is notched as at 762 for coupled association with the pin 754. The mechanism for moving the said link 755 into coupled association with the arm will be described later. When the said arm 750 draws the link 755 downwardly, the said hammer carriage 719 is resiliently drawn to the right by the spring 757 and when the hammers 718 etc. reach alignment with their related printing bars, a downwardly reaching ear 763 on the left end of the hammer carriage engages a stop pad of laminae 764 provided on the bracket 730, stopping the hammer carriage. The operation of the bell crank 756 is slightly excessive, the said spring 757 yielding after said ear 763 engages the stop pad. At this point it may also be noted that in the event the hammer carriage 721 is accidentally obstructed in any sort or manner, the said spring 757 will readily yield.

The hammers that are required to act are released shortly after the beginning of the second half of the cycle, namely shortly after the shaft 250 has moved a few degrees anti-clockwise of Figure 12. During this movement of the shaft 250 and for an appreciable further movement thereof, the roller 751 will rest in the depression of the arm 765, and the hammer carriage 719 will remain stationary in its rightwardly moved position. Only when the pin 766 in the reverse movement of the shaft 250 finally engages and displaces the arm 765 anti-clockwise, will the roller 751 and thus the arm 750 be freed to move upwardly under the tension of the spring 753. This causes the spring 727 to restore the hammer carriage to the normal position seen in Figure 3.

It has been stated that a latch plate 744 normally holds all the hammers against rearward hammering action, as in Figures 1 and 7. Toward the end of the first half of each cycle a pin 768 on an arm 770 borne fast on the cycling shaft 250, displaces idly a one-way yielding pawl 771 on a lever 772 supporting it and at the very end of the cycle the said pawl assumes the position seen in Figure 12. As the shaft 250 at the outset of the second half cycle starts to move anti-clockwise of Figure 12, the said pin 768 cams the pawl 771 as a unit with its supporting lever 772 downwardly. The said lever 772 is pivotally carried in the right-hand frame member 92, see Figure 3, by means of a short shaft 773. Upreaching and linked to the front end of the lever 772 is a plunger 774 having guiding support in a frame supported bracket 775, a spring 776 biasing said plunger downwardly for a pin 777 to engage normally said bracket 775. Operatively in line with said plunger 774, thereabove, is a rod 778 slidingly extending through a cross bar 780 and the cross bar 732. A collar 781 fast on said rod 778 rests normally on the said bar 732, the rod terminating just short of the latch plate 744. Providing the hammer carriage 719 in the first half cycle is moved rightwardly as hereinabove stated, then the actuation of the rod 778 upwardly at the beginning of the second half cycle will raise the latch plate 744 free of the hammer noses 745. Therefore, so far as the plate 744 is concerned, all the hammers are freed for hammering action under the power of their springs 746. However, there are additional devices supplementing the control of the latch plate 744 over the hammers and such devices will be described later herein. In order to maintain the latch plate 744 operated clear above the hammer noses 745 until the hammers have been restored, a holding dog 782 is pivotally provided on the bar 732 and is spring-urged to move under the collar 781 as the rod 778 is raised. After the latch plate 744 has been lifted to free the hammers, a restoring bail 783, see Figures 1, 3, and 7, universal to all the hammers 718, 718a, 718b, and 718c, is cycle-actuated to engage downreaching noses 784 on the hammers to restore all the hammers to their normal, forward positions. The said bail 783 in such actuation also engages an upreaching ear on the dog 782 to restore the latter to inactive position. This causes the rod 778 to drop into active hammer holding position. The said bail 783 is supported on a rock shaft 785 that is pivotally accommodated in downreaching branches of the brackets 730, 731. Near the left end the said shaft 785 carries an arm 786 which has a pin and fork connection with a lever 787 having pivotal support as at 788 in a bracket 790. A spring 789 urges the bail 783 to the normal position seen in Figure 7, such normal position being determined by an ear on the lever 787 contacting said bracket 790, see Figure 7. For operation of the lever 787 and therefore the bail 783, there is fast on the cycling shaft 250 an arm 791 carrying pivotally a dog 792 normally bearing against an ear 793 under the tension of a spring 794. During the first half cycle the arm 791 swings to the position seen in Figure 12 and the dog-thereon engages a pin 795 on the lever 787 and flexes to assume a cocked position in respect to said pin as shown in Figure 12. Then, during the reverse rotation of the arm 791, in the second half of the cycle, the pawl 792 operates the lever 787 temporarily to the dot-and-dash position seen in Figure 12 and thereafter rides clear of the pin 795, again to assume the normal position seen in Figure 7. Obviously, said bail 783 in such action executes a transitory hammer restoring motion.

12. *Amount printing bar lowering mechanism for protective sign printing also zero total*

All the amount printing bars 18, except those of the cents orders, as hereinbefore stated, have a protective sign type 94a normally opposite the printing line 19a. These protective sign types are disposed a unit step higher than the "0" types. The nature of certain business papers requires that in certain work columns there be printed to the left of the printed amount a series of protective signs, such as stars, serving to prevent fraudulent raising of the amount. The amounts so to be protected may be keyboard indexed amounts or total printed amounts, or both, depending on the particular requirements of the business instruments to be prepared. In total printing cycles, if the total is zero, it is required that at least one printing bar 18 of a cents order rise to zero position and stay thereat for printing. In each amount posting cycle there rises at least one printing bar 18 above zero printing position and others of orders leftwardly thereof rise at the beginning of the cycle to their zero positions. In total printing cycles if any printing bar 18 rises above zero position, the bars 18 to the left thereof rise at the beginning of the cycle to their zero positions. If the total is zero, all printing bars rise at the beginning of the cycle to their zero positions. To bring the protective sign types 94a in the required orders to the level of the printing line, before the printing phase of the cycle is reached, there is provided a mechanism which will draw the appropriate printing bars 18 automatically down. This mechanism will presently be described.

Directing attention particularly to Figures 1, 2 and 12, a rock shaft 801 pivotally supported in the two spaced frame members 92 of the computing machine framework, carries by means of two spaced arms 802, a bail rod 803. Upon this rod are pivotally carried in individual association with the register actuators 95 for the printing bars 18, substantially upright hook elements 804. All bail arms 802 abut normally a stationary rod 805 under the influence of springs 806 which variously have one end connected to the elements 804 and have anchorage on said rod 805, such springs having the additional function to urge the hook elements 804 clockwise of Figures 1 and 7, said elements having inclined front faces 807 normally engaging a stationary rod 808. Normally, the hooks 810 lie slightly to the rear of the rear edges of the actuator 95. During any item entry cycle, at least one of the actuators pertinent to the printing bars 18 rises above zero position in a fairly early phase of the cycle.

The same is true in total printing cycles, except if the total is zero. In that event all the actuators 95 rise to zero position in said early cycle phase. The rear edges of the actuator rising above zero position will rise above the level of the hooks of the related elements 804. By means yet to be described, the bail 803 is rocked downwardly in a later phase of the forward stroke of the cycle, carrying all hook elements 804 downwardly therewith. As this takes place, the springs 806 urge the elements 804 to swing forwardly. Those elements 804 which are associated with actuators 95 that have risen above zero position will come into resilient contact along the smooth rear edges of the actuators and will then glide idly down therealong. On the other hand, any element 804 which is associated with an actuator 95 to the left of the highest order one which has risen above zero position, will swing forwardly to hook over their related actuators and will draw these down to their normal positions placing or restoring the protective sign types 94a opposite the printing line 19a. Referring to Figure 2, it will be seen that all hook elements 804 have a tongue 812 reaching leftwardly behind their immediate leftward neighbors. Thus, any element 804 contacting against the rear edge of its associated actuator 95 will block all more rightwardly disposed elements 804 against swinging forwardly. The downward motion imparted to the elements 804 can affect thus only those actuators which happen to be of insignificant orders. It will thus be seen that in a machine cycle wherein at least one printing bar has risen above zero position, all printing bars to the left of the leftmost one so risen will eventually be drawn down and positioned so that the protective sign types 94a thereon lie opposite the printing line 19a.

In order that in total printing operations in which the total is zero, this be signified by the printing of zeros in the cents orders, the machine embodies a mechanism whereby the hook elements 804 of the cents orders are held rearwardly clear of the actuators 95. For this purpose, a total and a sub-total control slide for the cross-footer 213 herein respectively numbered 582 and 583, as well as two similar slides 582a and 583a, for the rear registers, all old in said Patent No. 2,194,270, are in control of the two lowest order hook elements 804 through a train of mechanism comprising a horizontal lever 585, a bail 586, a link 587, and a lever 588, the latter having a pin 590 for engagement with the hook element 804 of the second lowest order, which element has a higher reach than the others. Consequently, during any totalling or sub-totalling cycle, the hook elements 804 of the two lowest orders are controlled to move down without effect on the related actuators 95, leaving the printing bars in zero printing position until after the printing phase of the cycle has passed. The lever 588 is pivotally carried at one end of the bail rod 803.

The bail rock shaft 801, see Figures 1 and 2, has a forwardly reaching arm 815 which is operatable by an arm 816 mounted upon a rock shaft 817. The latter is pivotally supported in the framework of the machine including the left frame member 92. Leftwardly of the arm 815, a downwardly and forwardly reaching arm 820 on said shaft 801 is adapted for operation by a cam element 818 a pin on said arm 820 being engageable by said cam element. The said cam element is accommodated pivotally upon the cycling shaft 250 and is picked up by the cycle-shaft-supported-arm 365 with a delay, the said arm 365 having a pin 821 reaching into a slot in said cam. The said slot provides that during a first part of the first half cycle the cam 818 remains stationary and that after the actuators 95 have had an opportunity to rise above zero position, the cam will be picked up by the pin 821 to actuate it clockwise of the Figure 1 position. This causes the arm 820 to be cammed anti-clockwise, so that resultingly the lowering bail 803 for the hook elements 804 is actuated downwardly. In the second half cycle the lowered printing bar 18 remains lowered at least until after the printing hammers 718 have struck. To this end, the cam element 818, by reason of the slot therein, is picked up by the pin 821 with a delay. Due to the pressure which the pin on the arm 820 exerts against the cam element 818 under the influence of the springs 806, such cam element remains quiescent, except when forced to turn in either direction by the pin 821. A lip 827 on the cam element 818 prevents overthrow of the latter clockwise of Figure 12, and a frame-supported pin 828 indicated in Figure 1, prevents overthrow in anti-clockwise direction. The described mechanism provides that in all amount entry cycles the printing bars 18 to the left of the highest order one rising above zero position are retracted to place star types 94a thereon opposite the printing line 19a. The mechanism also provides that in total printing cycles the printing bars 18 of dollar orders which are to the left of the highest order printing bar 18 rising above zero position, are retracted to place star types 94a opposite the said printing line 94a. Since in total printing cycles the hook elements 804 of the cents orders are held rearwardly, it follows that in the event the total is zero, the printing bars 18 of cents orders will locate zero types opposite the printing line. Furthermore, of course, leftwardly of the cents orders, the printing bars 18 will be retracted so that the star types thereon are opposite the printing line 19a.

The printing bars 18a serving to print folio numbers embody no star printing type 94a and for that reason reach up one unit space short of the printing bars 18.

No lowering hook elements 804 are associated with the folio printing bars 18a.

13. Operation of appropriate printing hammers 18 and 18a

The printing hammer latch plate 744 is normally in the effective position seen in Figure 1, blocking all hammers 718, 718a, 718b and 718c against operation. The plate 744 is cycle released at the beginning of the second half of each cycle in which the hammer carriage 719 is moved rightwardly to the position illustrated in Figure 8. Associated with the hammers 718 is also a blocking slide 830 which holds normally all these hammers 718 against rearward operation. Similarly, there is provided a blocking slide 831 which normally holds all the hammers 718a against rearward operation. The said blocking slides 830, 831, see Figures 1, 4, 5 and 7, are provided generally at different levels, the one numbered 830 being at the level of the fingers 733 of the hammers 718 and the one numbered 831 being at the level of the fingers 733 of the hammers 718a. The blocking slide 830 has headed pins 832 whereby it is slidably associated in slots 833 provided in the top plate 720 of the hammer carriage 719. The blocking slide 831 has also headed pins 832 whereby it is slidably associated in slots 833 provided in the lower plate 724 of the hammer carriage 719. The slots 833 extend lengthwise of the platen 11 and individual springs 839 urge the slides 830, 831 on the hammer carriage 719 to rightward limits provided by said slots 833, the normal positions of the said slides being as illustrated in Figure 3.

The blocking slide 830 has a printing bar sensing finger 834 lying normally just leftwardly of the series of printing bars 18 and reaching slightly above the upper ends of such printing bars. The blocking slide 831 has also a printing bar sensing finger 835, but such finger lies normally just leftwardly of the gang of printing bars 18a. This latter finger, see Figures 1 and 7, reaches about to the same level as the finger 834, a little more than a one unit space above the top of the printing bars 18a in their normal positions.

It has been stated that in each cycle wherein one or more of the printing bars 18, 18a, 18b, 18c rise at least one unit space, the hammer carriage 719 will move rightwardly in such cycle to bring the various hammers into operative registration with their related printing bars. In any such rightward movement of said printing hammer carriage 719 the blocking slides 830 and 831 are resiliently urged by the springs 839 as far as they may go unobstructed by the printing bars 18 and 18a. In respect to the printing bars 18, this means that the sensing finger 834 moves rightwardly until it encounters the highest order printing bar 18 which upon elevation to or beyond zero printing position has remained unretracted by its related hook element 804. In respect to the printing bars 18a, the slide 831 moves rightwardly along with the hammer carriage until its sensing finger 835 moves against the highest order printing bar 18a which rises higher than to zero position. The hammer carriage arrives in its rightward position substantially at the end of the first half cycle, wherefore the blocking slides 830 and 831 will occupy the required blocking positions before the latch plate 744 becomes released at the printing phase of the cycle. It follows thus that when the latch plate 744 is released, only such of the hammers 718, 718a are actuated by their springs 746 as have become unblocked by the slides 830 and 831. If in any printing cycle none of the printing bars 18a rise above zero position, then blocking slide 831 will move with the hammer carriage until a stop 831a on the slide will strike the left side wall 71 of the typewriter. Said slide in such event will block all the printing hammers 718a.

14. Hammer carriage operation only in printing cycles

The printing hammer carriage 719 is controlled to move rightwardly in all cycles in which one or more of the amount printing bars 18 rise above zero position and also in total printing cycles in which the total is zero and thus none of the printing bars rise above zero position. In such cycles, but not otherwise, at least one of the hook elements 804 is controlled to become cycle-actuated downwardly in a rearward path, said elements 804 having each a shoulder 840 to depress, when so actuated, a bar 841 of a bail which includes two spaced arms 842, see Figures 1, 2, 7 and 12. The said bail 841, 842 includes a shaft 843 by which it is pivotally supported in the spaced frame member 92 and an additional frame member 844, see Figures 2 and 3. Fast on the right end of the shaft 843, see Figure 2, there is a downreaching arm 845 which by a link 846 is connected with the link 755 of the hammer carriage actuating mechanism. Normally, under the tension of a spring 847, see Figure 7, the bail 841, 842 occupies the position seen in Figures 1 and 7, so that the link 846 maintains the link 755 uncoupled from its actuating arm 750. In any cycle in which any of the printing bars 18 is required to print either a keyboard-set-up amount, or a total, or a zero total, the actuation of one or more of the hook elements 804 downwardly in its said rearward path will operate the bail bar 841 downwardly and, through the mechanism just described, will cause the hammer-carriage-actuating-link 755 to become coupled to the pin 754 of the arm 750. This determines that in the instituted cycle the said link 755 will become cycle actuated, the hammer carriage assuming its correct position as the second half phase of the cycle starts. The said bail 841, 842 remains operated under the control of the cam 818 closely to the conclusion of the cycle to the end of not causing premature leftward restoration of the hammer carriage.

15. Carriage control for date and folio number printing

As is conventional practice in the machine of said patent to Sundstrand, No. 2,194,270, date keys are set up each day to control the rise of the date printing bars 18b to their appropriate positions, there being provision to retain the set-up until deliberately changed again. The folio number and the amount printable respectively by the bars 18a and the bars 18, may be set up in the respective keyboards related to such bars, one after the other, and in one cycle the said bars 18b, 18a and 18 may print the set-up date, the set-up folio number and the set-up amount, providing the machine is properly conditioned for such operation by the carriage. At the end of any such cycle the stop pins 108 related to the printing bars 18 and 18a become automatically restored in a conventional manner. At this point it will be remembered that if no folio number is indexed preceding a cycle, then the folio printing bar hammers 718a remain blocked against operation by the laterally movable slide 831. Additionally, the machine includes a carriage controlled provision whereby the folio printing bars 18a and the date printing bars 18b are held against rising from their normal lowered positions except if the paper supporting carriage 10 is stationed in a particular position. To this end, see Figure 1, the actuators 95 for the folio printing bars 18a and the date printing bars 18b have all a rearwardly extending lug 848 with which there is associated a plate 849 hingedly supported on the frame and blocking normally all actuators 95 related to such printing bars against upward movement. The blocking plate 849 is spring-urged to occupy usually the position of Figure 1A, but when the paper supporting carriage 10 moves into a position presenting a tappet 297 on a control dog 296 over the cam element 323 on the selector 314, the latter will be depressed and consequently the said blocking plate 849 is swung rearwardly to idle, unobstructing position. Specifically, when the selector 314 is so depressed, a rod 850 transmits a downward motion to a rocking structure 851 which in turn operates a bell crank 852 having a cam finger 853 to swing said plate 849 rearwardly. A spring 854 restores the mechanism to its normal position seen in Figure 1A. To prevent the hammers 718b for the date printing bars 18b from operating at all times except when a carriage tappet 297 operates the selector 314, the rocking structure 851 has a link connection 855, see Figures 1 and 1A, which is in control over a pivoted blocking element 856 for the date hammers 718b, see Figures 1, 3 and 8. It will now be seen that these hammers 718b become operated only if in a cycle subsequently to the rightward movement of the hammer carriage the universal blocking bail 744 while the blocking element 856 stands released under carriage control, free of the noses 784 of the hammers 718b. The said blocking element 856 has pivotal support on a bracket 857 carried on the cross-bar 732.

The described mechanism provides, that if the carriage 10 is in a position wherein a tappet 297 depresses the selector 314, and there have been set up appropriate stopping conditions for the date printing bars 718b, the folio printing bars and the amount printing bars, then all these bars will rise and print in a machine cycle instituted. The printed amount will be entered in the appropriate crossfooter 213 and/or one or more of the registers A, B, C, D, as may be predetermined by appropriately providing tappets 297 on the carriage dogs 296. In such carriage positions wherein the actuator blocking plate 849 is in the effective position seen in Figure 1A, only the amount printing bars 18 can rise to printing positions, either as predetermined by the indexing mechanism comprising the stop pins 108, or as predetermined in accord with the total contained in the crossfooter 213 or in one of the registers. Therefore, in any columnar position of the carriage, except in such as the selector 314 is carriage operated, only the printing bars 18 may be active, either as predetermined by the amount set-up keys or a total in a register.

16. Carriage control for protective sign printing

The feeler slide 830 in printing cycles is ordinarily drawn rightwardly by the positioning movement of the hammer carriage 719, resiliently, until the feeler portion 834 thereon is arrested by the highest order printing bar 18 which has risen to a printing position. The position of said feeler slide 830 consequently suppresses the operation of such hammers 718 as are related to insignificant order printing bars. In connection with certain work it is desirable to protect the amounts in certain columns against fraudulent raising. Accordingly the machine provides that in connection with such columns the feeler slide 830 is intercepted in a more leftward position to leave at least some of the hammers to the left of the highest significant order printing bar unblocked thereby. Then at the printing phase of the cycle, there will be hammers 718 striking against all significant order bars 18 and additionally against some more leftwardly disposed bars 18. The means for intercepting the slide 830, see Figures 3, 6 and 8, comprises a vertically movable rod 858 which normally is clear below a rearwardly reaching stop finger 859 on said slide. In any position of the paper supporting carriage 10 wherein an amount to be printed is to be protected against fraudulent raising, the said rod 858 is automatically raised from the idle full-line position in Figure 6 into intercepting range of said stop finger 859, see the dot-and-dash position in Figure 6. Therefore, if the machine is cycled for an item entry and the carriage has position wherein the rod 858 is raised, then the feeler slide 830 will move only as far as permitted by said rod. This leaves some of the printing hammers which are to the left of the highest significant order printing bar unobstructed to hammer against printing bars 18 which have a star type opposite the printing line 19a. The said rod 858 is adapted to be installed in various perforations 860 provided in the bracket 701, in different stopping positions to suit different business forms. Having now more specific reference to Figures 1 and 1A, such rod is supported upreaching from an arm 861 that is carried fast on a shaft 862, the latter having pivotal support in the framework of the machine. Rearwardly reaching from and fast on said shaft 862 is an arm 863 having a pin 864 overlying it and operable by the selector 313. A spring 865 biases the just-described parts to occupy normally the positions seen in Figures 1 and 1A. In positions of the carriage wherein the amount to be printed is to be protected against fraudulent raising, a tappet 297 on a dog 296 is provided to depress the selector 313 and thereby to cause the rod 858 to be lifted to intercept the feeler slide 830 and thereby to establish the stated condition for protective star printing. If desired, the machine may also be provided with means to lift the rod 858 in connection with the conditioning the machine for total taking operation, but no such is illustrated.

17. Function signal printing control

The signal printing bar 18c is adapted to print signs or signals for identifying the nature of the amount entries made by the printing bars 18, the printed signs identify totals, sub-totals, etc. In every printing cycle the latch plate 744 which is common to all the hammers, including the signal printing bar hammer 718c, is operated as the printing phase of the cycle is reached, this being after the hammer carriage has been moved rightwardly. The hammer 718c for the signal printing bar 18c, however, must not operate unless such bar in a cycle rises for printing. To suppress operation of the hammer 718c for the signal printing bar if such bar does not rise and thus is not required to print, there is provided a vertical rod 868, see Figures 1, 3 and 7, which normally reaches upwardly to the level of the nose 784 on the hammer 718c. For the purpose of normally maintaining the rod 868 in such position, see Figure 7, the actuator 95 for the signal printing bar 18c has a laterally projecting pin 869 holding normally a lever 870 anti-clockwise moved in opposition to a spring 871. The rod 868 stands on the front end of the lever 870, vertically guided in perforations provided in the cross-bars 732 and 789 of the machine. The lever 870 has pivotal support on the right-hand frame member 22. Whenever the signal printing bar 18c rises in a printing cycle to present a proper type opposite the printing line, then the pin 869, on the related actuator 95 causes a spring-urged movement of the lever 870 to lower the rod 868 to non-blocking position. Subsequently, when in the same cycle the latch plate 744 for all the hammers is released, the signal bar hammer 718c is freed for hammering action by its spring 746.

18. *Blank cycle enforcing mechanism*

To assure that the units transfer mechanism for the cross-footer or the registers are in normal condition, ready for action, preparatory to a totalling or a sub-totalling operation, means are provided in association with the total and sub-total keys 304a, 306a, 305a and 307a, to free such keys only for depression in the event the machine is first given a blank cycle, that is, a cycle in which neither the crossfooter nor the registers are affected.

The mechanism for this is shown in Figure 14, wherein a blank cycle is assumed to have taken place, and wherein consequently a locking slide 621 is in a rearward position, presenting blocking shoulders 622 thereon to the rear of and out of operating range of protuberances 623 on the stems 611 of the total keys 304a, 306a and the sub-total keys 305a and 307a. Thus, in Figure 14, these keys are free to be operated.

A spring 626 constantly tries to move the locking slide 621 forwardly to move the shoulders 622 under the related protuberances 623. Toward conclusion of any blank cycle, in a manner to be stated, a control member 627, having pivotal support at 628, assumes a lowered position, seen in Figure 14, under the tension of a spring 630. In this position of the member 627, a cam face 631 thereon is operative on a pin 632 of the locking slide 621 to locate the latter in a rearward, ineffective position.

A pendant arm 635 has a lug 637 projecting laterally into an opening of the member 627 which affords a high recess 638, a low recess 640, and a down-reaching nose 641 therebetween. After any blank cycle, the lug 637 is contacted by the control member 627 in the high recess 638 as shown in Figure 14. After any computing cycle, the lug 637 is posed underneath the low recess 640. To allow the pendant arm 635 to swing forwardly in some of the cycles, a pin 639 on a member 642 which is carried on the cycle rock shaft 250, encounters a cam face 643 on the control member 627 in the forward stroke of every cycle. The cam face 643 is shaped to cause the control member 627 to be sufficiently raised after the beginning and up to the end of every cycle for the lock slide shoulders to be located under the key protuberances 623. Moreover, the cam face 643 is shaped to cause the nose 641 to be lifted above the lug 637 before the end of the forward stroke of the cycle is reached.

Provision is made so that at the end of the forward stroke of any computing cycle, and for the remainder of each such cycle, the lug 637 of the arm 635 will underlie the low recess 640. It will be remembered that during any computing cycle, the bail 841 is downwardly displaced through the hook elements 804. This displacement of the bail 841 is utilized to actuate the pendant arm 635 forwardly. The means for this comprises at the right end of the bail shaft 843 a downwardly reaching arm 633, and a link 634 reaching forwardly from the arm 633 and having a pin-and-slot connection with the pendant arm 635. A spring-urged latch 644 swings into position behind the arm 633 as the bail 841 reaches operated position. Consequently, at the end of any computing cycle, the pendant arm 635 lies in a forward position with the lug 637 posed below the low recess 640, and will remain thereat so long as the latch 644 remains effective.

In the return stroke of any cycle, the pin 639 riding rearwardly along the cam face 643 causes the control member 627 to be drawn downwardly by the spring 630. If the cycle is a computing cycle, the lug 637 is contacted by the low recess 640, in front of the nose 641, thus blocking the pendant arm 635 against movement to rearward position. The position of the control member 627 is then still sufficiently high for the locking slide 621 to remain in forward, effective position. As any computing cycle nears conclusion, a pin 645 on the cycle rock shaft 250 releases the latch 644, causing the bail 841 to be spring restored. The pendant arm 635, however, remains in forwardly displaced position because rearward movement of the lug 637 is obstructed by the nose 641. Inasmuch as the lock control member 627 is prevented from moving to lower position, the lock slide 621 remains in locking position. Moreover, it will remain thereat until the machine is given a blank cycle. Toward the conclusion of such blank cycle, the control member 627 moves to the lower position seen in Figure 14, this taking place by the power of the spring 630, under control exercised by pin 639 in conjunction with the cam 643. From the above, it follows that at the end of any computing cycle, the arm 635 is in a forward position, and at the end of any blank cycle, the same arm is in a rearward position. Always at the beginning of a first computing cycle following a blank cycle, the lock slide 621 will move to effective position. It will remain thereat until the end of the first blank cycle following a computing cycle. Moreover, the lock slide 621 will always be in effective position after the beginning of a blank cycle and until such cycle nears conclusion. This means that every operation of one of the total or sub-total keys must be preceded by a non-computative cycle, commonly termed a blank cycle.

19. *Work example of Figure 15*

A simple one of many possible business applications for which the machine is suited is illustrated diagrammatically in Figure 15. The numeral 660 designates a conventional accounting form having a "date" column, a "folio no." column and an "old balance" column all adapted to be printed upon in one machine cycle, respectively by the date printing bars 18b, the folio printing bars 18a and the amount printing bars 18. The "description" column is adapted to be filled by the typewriting instrumentalities comprising the type bars 17. Entries in the "debit," "credit" and "balance" columns are made in different machine cycles by the amount printing bars 18 with the carriage appropriately tabulated leftwardly to these columns.

The numeral 14 indicates the rail bar of the paper supporting carriage 10, and a plate for supporting the function control dogs 296 is indicated at 298. If different accounting or work forms are to be used, plates 298 with control dogs 296 making up different programs of operations are substitutable. The accounting form shown in Figure 15 there has no column calling for the protection of any printed amount by stars. The accounting form 660 and the control plate 298 with its dogs 296 thereon, partake in the movements of the carriage 10. On the other hand, the printing bars 18, 18a, 18b, 18c, the type guide 21, the function selector cam elements 323, as well as tabulator stop arm 350 are all frame-supported. The carriage 10 with accounting form 660 is shown in a position for the latter to receive a date entry, a folio entry, an old balance entry and possibly a signal entry, all concomitantly in one cycle, the shown carriage position having been arrived at in an automatic tabulation instituted at the end of a power return of the carriage 10, in a manner fully described in said application, Serial No. 66,441, and one of the function control dogs 296 being in overlying registration with the cam elements 323 provided on the function selectors 301 to 317. It will be noted that each of the various computing columns has associated therewith, see vertical dot-and-dash lines 347, one of the function control dogs 296, such dogs serving also as tabulator stops.

The machine includes the conventional provision disclosed in Patent No. 2,194,270 whereby the crossfooter 213 stands normally selected for engagement in any cycle. With the carriage positioned as in Figure 15, the operator sets up appropriate stopping conditions for the printing bars 18b, 18a and 18 in the respective keyboards related thereto, substantially as in said Patent No. 2,194,270. The control dog associated with the old balance column includes a tappet 297 over the selector 314 and consequently the actuators 95 for the folio and date printing bars 718a and 718b are unobstructed by the plate 849, and, furthermore, the blocking element 856 for the date hammers is in ineffective position. When then the operator depresses an adding machine cycling key, not shown, the printing bars 18, 18a and 18b rise under control of the cycling mechanism in accord with the indexing conditions established therefor. After the stated printing bars have had an opportunity to rise at least a little more than one unit step the hook elements 804 will draw down the printing bars to the left of the highest order bar which rises above zero position. Subsequently the hammer carriage 719 is moved rightwardly to register at the end of the first half cycle all the hammers with their related printing bars. In such movement the blocking slide 830 moves rightwardly until intercepted by a printing bar which has not been lowered by a hook element 804. The slide 831 moves rightwardly until it is arrested by the leftmost printing bar 18a which has risen above zero position. All insignificant order printing hammers 718 and 718a are thus blocked against operation, it being understood that up to the printing phase of the cycle all the hammers 718, 718a, 718b and 718c are held by the universal latch plate 744.

As the printing phase of the cycle is reached, the plate 744 is lifted automatically and those of the hammers 18, 18a, 18b which are then unobstructed by the slides 830, 831 become spring-operated to hammer appropriate printing bars against the platen. All hammers are then cycle restored forwardly and subsequently also all the printing bars become restored, the hammer carriage toward the end of the cycle being returned leftwardly, leaving the typewriter bars 17 clear for operation. Because the control dog 296 which has been active in this operation includes a tappet 297 registering with the tabulation cut-out selector 315, the carriage tabulating mechanism will not function in accompaniment with the stated cycle. Moreover, from Figure 15 it will be seen that the accounting form 660 is in a position ready to be typed upon in the "description" column. Moreover, since at all times, except when a tabulating movement is taking place, the carriage 10 is under control of the escapement 80, the operator may immediately type in said "description" column. Having typed appropriately in the "description" column, the operator depresses a tabulating key and a movement of the carriage ensues which brings the "debit" column into registration with the amount printing bars 18. If a debit is indexed and the cycle key is then operated, such debit will be printed by said amount bars 18, the hammers associated with insignificant order printing bars being suppressed against operation by the slide 830. Since the dog 296 associated with the "debit" column has no tappet 297 for pressing the date and folio printing selector 314, the date printing bars 18b and the folio printing bars 18a are blocked against operation by the plate 849. Also, since none of the folio printing bars rise, the slide 831 will move rightwardly to block all folio printing hammers 718a against operation. The date printing hammers 718b are blocked against operation in view of the stated absence of a 297 tappet in respect to the selector 314. The amount entered into the "debit" column will be accumulated in register D and the crossfooter.

The entry in the "credit" column is effected similarly but the crossfooter 213 will receive this amount negatively and the register C positively. The dog 296 preceding the rightmost one institutes a cycle to restore such tens-transfer mechanism as may have been tripped in the cycle effected in the "credit" column, in conventional manner. In the "balance" column, the balance in the crossfooter 213 is automatically cleared therefrom and total-printed, register B receiving a total transfer. This all occurs in an automatic cycle which also effects a line-feed of the platen. The total taking condition of the machine prevalent in the "balance" column causes the blocking rod 867 for the signal printing hammer 718c to be withdrawn downwardly so that when in this column the balance is being printed, this will be signified by the printing of a signal seen at the right of the balance.

20. *Work example of Figure 13*

In the example of the business form seen in Figure 13 the amount appearing in the rightmost column shown therein is required to be protected against raising by the printing of protective signs (stars) leftwardly thereof. The entries made in the date column, the check-number column and the amount column may be made, all at once, in a single cycle as explained in connection with Figure 15. In connection with the said last column shown in said Figure 13, a control dog 296 is provided which includes a tappet 297 to act upon the amount-protection selector 313. When an entry is made in the said last column the stop rod 868 for the feeler slide 830 is projected upwardly to the dot-and-dash position of Figure 6, whereby as the hammer carriage is cycle-moved rightwardly the said slide 830 will move short of the highest order significant printing bar 18. Thus there are released at the printing phase of the cycle not only the hammers 718 pertinent for printing the particular amount but also some of the hammers 718 immediately leftwardly thereof and in front of which the printing bars 18 have become positioned so that the star types 94a are opposite the printing line 19a.

21. *Modifications illustrated in Figures 9 and 9A*

In machines wherein printed amounts are never required to be protected against fraudulent raising, the amount printing bars 18 need not have star types 94a, and consequently also the hook elements 804 and related mechanism to lower such printing bars may be eliminated. Amount printing bars 18 so modified are shown in Figure 9A and have each a "0" type uppermost thereon one unit space below the printing line 19a. In other words the bars 18 may be the same as the folio printing bars 18a. Accordingly, in each printing cycle, the feeler slide 830 senses off the highest order significant printing bar 18 which has risen above zero position, wherefore said slide then blocks all printing hammers 718 in the orders thereabove against operation.

The link 755 by which the hammer carriage 719 is rightwardly cycle-actuated, as indicated in Figure 9, may be permanently connected to the operating arm 750 for operation of the hammer carriage 719 rightwardly in each cycle. However, a control mechanism is provided for the link 774 so that the hammers 718 may only be rendered active in cycles in which at least one of the printing bars 18, 18a, 18b or 18c rises more than one unit step. In Figure 9 the upper ends of the actuators 95 are shown to have a cam face 872. When any of the printing bars 18, 18a, 18b or 18c rises more than one unit step, then the cam face 872 of the actuator 95 related thereto acts upon a bail bar 873 of a bail structure 874 to rock the same from the normal position seen in Figure 9, anti-clockwise about its fulcrum shaft 875, counter to the tension of a spring 876. The said bail structure 874 has a link 877 connecting it with the upper end of the link or plunger 774 heretofore described but having its upper end movable fore and aft, and being normally disposed clear to the rear of the rod 778. It will be seen that whenever any one of the printing bars 18, 18a, 18b or 18c in a cycle rises more than one unit step, then one of said cam faces 872 will cam the bail 874 rearwardly so that the link 774 will be swung under the rod 778, wherefore in such cycle, at the printing phase, the universal blocking plate 744 will be released.

In total taking operations wherein the total is zero it is desirable to signify this by the printing of two zeros in the cents orders. In such cycles no printing bar rises more than one unit step and yet the said universal blocking member 744 must be released to allow action of the hammers 718 in the cents orders, thereby to provide for the printing of two zeros. Accordingly means are provided to move the plunger 774 into operative alignment with the rod 778 in all total printing cycles. To this end the bail 586 of the total printing conditioning mechanism has an upreaching arm extension lying in back of a pin 878 whereby whenever the machine is conditioned for total taking, the said plunger 774 is moved forwardly under the rod 778 and whereby in each total printing cycle all hammers 18, 18a, 18b and 18c are rendered free of the said universal blocking plate 744. The feeler slide 830 in all printing cycles including total printing cycles moves rightwardly as far as it will go. If the total is zero then none of the printing bars 18 rise into stopping range of said slide 830. To stop said slide 830 so that incidental to total taking operations it will never block the hammers 718 of the cents orders, the said bail structure 586 of the total taking conditioning mechanism is adapted to lift a stop rod 879 into stopping range of the finger 859 of the feeler slide 830, said stop rod 879 being so located that said feeler slide 830 will block only the dollar order hammers 718. The said stop rod is guided at its upper end in a perforation of the bracket 701 and at its lower end has a pivotal association with a bell crank 880 carried on the frame work of the machine. A link 881 connects the said bail structure 586 with said bell crank 880 so that whenever said bail structure is in total taking position said stop rod is in position to stop said slide 830.

It will be seen that the mechanism of Figure 9 provides that although the hammer carriage 719 receives a positioning movement in each cycle, the universal latch plate 744 for the hammers becomes only actuated in cycles only wherein printing is to take place whether the cycle be an amount-entering cycle or a total printing cycle. Of course, the release of the universal latch plate 744 does not by itself determine which of the hammers are to be active, because other elements 830, 831, 856 and 868 described hereinabove supplement the latch plate 744 in exercising such control.

22. Conclusion

While the invention has been described with reference to certain embodiments illustrated in the drawings, it is to be regarded to comprehend such modifications and departures as may be within the general purposes of the improvements or the scope of the hereinbelow presented claims. Moreover, certain features of the invention may be used without others or with substitute features generally producing the same results.

What is claimed is:

1. A record preparing machine comprising in combination, a series of adjacent-order printing bars having each a row of rearwardly facing types, the said printing bars differentially positionable to present different types thereon selectively opposite to a printing line, hammer means at the front of the printing bars, adapted in a certain lateral position to hammer rearwardly for the types presented at the printing line to effect imprints, a plurality of typewriter type bars situated lower than said hammer means, and operating in converging planes in front of said printing bars for selective operations from diversive normal positions to type at a common typing point in said printing line, at least some of said typewriter type bars requiring for their stated operations space which said hammer means needs for hammering while in the said certain lateral position, means to move said hammer means between the said certain lateral position and another position free of the operating space required for said typewriter type bars, and means to control said hammer means for rearward hammering action upon being first moved to said certain lateral position.

2. A record preparing machine comprising in combination, a series of adjacent-order printing bars having each a row of digit types thereon, said printing bars being differentially actuatable to position opposite a printing line appropriate types representative of amounts to be typed, a series of elements generally at the level of the printing line and in a relation of operative association with said printing bars adapted for individual rearward operation to cause printing by the positioned digit types, typewriting means normally disposed below said elements in front of said printing bars and selectively operable to type different characters at a typewriting point situated in said printing line, the said typewriting means requiring for operation space which also said elements require for rearward operation, movable means to support said elements, said elements collectively movable oppositely by said supporting means from said relation of operative association with said printing bars, clear of the operating space required by said typewriting means, and means operatively arranged above the normal disposition of typewriting means and governed thereabove by the printing bars in view of their differential actuations to cause the operation of only such of said elements as are required for the printing of significant amount digits.

3. A record preparing machine comprising in combination, a series of adjacent-order printing bars differentially actuatable to position opposite a printing line appropriate types representative of amounts to be typed, a series of hammers arranged generally at the level of the printing line and adapted for individual rearward operation in lateral registration with said printing bars to cause printing by the types which said printing bars position at said printing line, typewriting means disposed below the said hammers in front of said printing bars and selectively operable to type different characters at a typewriting point in said printing line, the said typewriting means requiring at least some space for operation which also the said hammers require while in lateral registration with said printing members, means to support and move said hammers collectively to one side of the machine, clear of the operating space required by said typewriting means, and means arranged above the normal disposition of said typewriting means and governed thereabove by the printing bars in view of their differential actuations, to control said printing hammers for rearward operation of only such as are required for printing the significant amount digits.

4. A record preparing machine comprising in combination, a series of adjacent-order printing members, machine cycling means, means including said machine cycling means to position differentially the said printing members to thereby locate different types thereon opposite a printing line, a series of elements related to said printing members adapted to occupy positions from which they are individually operatable to effect printing displacements of the said types which are located opposite said printing line, typewriting means located in the proximity of said printing members so as to require at least some space for operation which also the said elements require for effecting said printing displacements, the said elements normally collectively disposed clear of the operating space required by said typewriting means, means including said machine cycling means to move said elements in a certain phase of the machine cycle collectively from the positions in which they are individually operatable for effecting said printing displacements, to occupy normally positions clear of the operating space required by the typewriting means, and means including also said machine cycling means to effect in another phase of the machine cycle printing displacements of said elements while they are in said positions for effecting the said printing displacements.

5. A record preparing machine comprising in combination, a series of adjacent-order printing members being all differentially positionable to amount representative positions wherein different types thereon are located opposite a printing line, a series of printing hammers substantially at the level of the printing line and adapted for individual hammering operations while in lateral registration with said printing members to cause printing at said printing line from the types positioned thereat, actuatable means normally below said hammers but requiring space for actuation which said hammers require for hammering operations while in lateral registration with said printing members, springs for operating said hammers, universal means normally blocking all said hammers against operation, means to move said hammers collectively between their positions of lateral registration with said printing bars and other positions clear of the actuating space required by said actuating means, other hammer blocking means, controlled to block only such hammers as are not associated with printing members assuming amount-representative positions, means to release said universal blocking means after the printing members are differentially operated and the said hammers are in lateral registration with said printing members, whereby the hammers which are freed by both said hammer blocking means become spring-operated to effect printing, and means to restore said hammers to the control of said universal blocking means.

6. A record preparing machine comprising in combination, a series of adjacent-order digit printing members, means to position differentially said printing members to locate different digit types thereon opposite a printing line, a series of elements related to said printing members, generally at the level of the printing line and operable to effect printing impressions off said located digit types, typewriting means disposed normally below said elements and with respect to said printing members so as to require space for operation which also said elements require to effect said printing impressions off the located digit types, the said elements normally collectively disposed laterally out of registration with said printing members to provide ready operating space for said typewriting means, means to support said elements for collective lateral movement into and out of registration with said printing members and to support them also individually operable to effect printing displacements of the digit types while in registration with said printing members, means to operate said elements on said supporting means, and means carried on said supporting means and sensitive to the printing members in view of their differential positioning movements, to cause only such of said elements to be operated by said operating means which are required to print the significant amount represented by the positioned printing members.

7. A record preparing machine comprising in combination, a worksheet supporting carriage, a series of adjacent-order printing members having each a row of types including digit types ranging from "9" to "0" and also a protective-sign-type, means to position the printing members of appropriate denominational orders differentially to locate digit types opposite a printing line in accord with digits of a particular amount to be printed and to locate higher order printing members so as to locate the protective-sign-type thereon opposite said printing line, printing hammers, operable in positions of lateral registration with said printing members to cause imprints off such types as are located opposite said printing line, typewriting means to type characters selectively on said printing line in the general region of said printing members and requiring space for operation which also is required by said hammers when they are in positions of lateral registration with said printing members, the latter being fully above the unoperated typing means, means to move said hammers laterally either to place them in positions of lateral registration with said printing members or to position them free of the operating space required by said typewriting means, control means for said hammers, comprising, means sensitive to the printing members being differentially positioned to cause those hammers to be active which are pertinent for the printing of the significant amount digits, and means subject to the control of the worksheet-supporting carriage to cause in certain positions of such carriage other hammers of immediately higher denominational orders to be active for the printing of amount-protective signs.

8. A record preparing machine comprising in combination, two neighboring series of adjacent-order printing members having each a row of types including digit types ranging from "9" to "0," means to position differentially the printing members of each said series to locate digit types opposite a printing line for the printing of two multi-digit numerals, a printing hammer for each printing member of the two series, springs for operating said hammers, means normally blocking all said hammers against operation, an element associated individually with each series of printing members, each for sensing movement transversely thereto and interception by the particular printing member of the series which is the higest order one being positioned above a "0" printing position, a separate blocking means conditioned under control of each of said elements to block those hammers which in reference with each series of printing members are related with those of insignificant order, the said two element-controlled blocking means arranged in two different planes for independent cooperation with the associated series of printing members, and means to release said first blocking means after each said element-controlled blocking means has been conditioned.

9. A record preparing machine comprising in combination, a work-sheet supporting carriage, a series of adjacent-order printing members having each a row of types including digit types ranging from "9" to "0" and also a protective-sign-type, means to position the printing members of appropriate denominational orders differentially to locate digit types opposite a printing line in accord with digits of a particular amount to be printed and to locate higher order printing members so as to locate the protective-sign-types thereof opposite said printing line, a printing hammer for each printing member, and control means for said hammers, comprising, means sensitive to the printing members being differentially positioned to cause those hammers to be active which are pertinent for the printing of the amount digits, and comprising means under control of said carriage to cause other hammers of immediately higher denominational orders to be active for the printing of protective signs.

10. A record preparing machine comprising in combination, a series of adjacent-order printing members having each a row of types including digit types ranging from "9" to "0" and also a protective-sign-type, means to position the printing members of appropriate denominational orders differentially to locate digit types opposite a printing line in accord with digits of a particular amount to be printed and to locate higher order printing members so as to locate the protective-sign-types thereof opposite said printing line, a printing hammer for each printing member, and control means for said hammers, comprising, an element movable transversely of the series of printing members rightwardly for interception normally by the particular printing member which is the highest order one being positioned above a "0" printing position, means conditionable to intercept said element short of reaching said particular printing member, and means controlled by the different extents of movement of said element to provide that normally only the hammers of significant orders become active and to provide when said conditionable means is conditioned that additional, more leftward order hammers become active.

11. A record preparing machine comprising in combination, a work supporting carriage, a series of adjacent-order printing members including each a set of digit types ranging from "9" at the bottom to "0" at the top and including each also a protective-sign-type above said "0" type, all said "0" types being normally disposed below a printing line, means to actuate in accord with an amount to be printed printing members of appropriate significant orders so as to place appropriate digit types opposite the printing line and to actuate other printing members of insignificant denominational orders so as to place the "0" types thereon opposite the printing line, means thereafter to place the protective sign types of said insignificant order printing bars opposite said printing line, a normally ineffective hammer for every printing member, and means to control said hammers for operation, comprising, means sensitive to said printing members in view of their differential actuations to control said hammers for only such to be active as are associated with printing members of significant order, and comprising means dominant over said sensitive means, to control said hambers for all to be active.

12. A record preparing machine comprising in combination, a series of adjacent-order printing members having each a row of types including digit types ranging from "0" at the top to "9" at the bottom, machine cycling means, means including said cycling means to position said printing members differentially to locate appropriate digit types opposite a printing line in accord with a particular amount to be printed, elements related to said printing members and operable when in lateral registration therewith to effect printing off the located digit types, a universal blocking means normally restraining said elements against operation, typewriting means located to require space for operation which also said elements require while they are in lateral registration with said printing members, said elements located above the unoperated typing means, supporting means for said elements movable laterally of the machine between a normal position in which said elements are free of the operating space required by said typewriting means and an operated position in which said elements are in registration with said printing members, means comprising said cycling means to move said supporting means from said normal to said operated position and to return it, and means controlled by any of said printing members being positioned so as to locate a type of significant digit value at the printing line, to cause the operation of said cycling means to release said universal blocking means.

13. A record preparing machine comprising in combination, a series of adjacent-order printing members having each a row of types including digit types ranging from "0" at the top to "9" at the bottom, machine cycling means, means including said cycling means to position said printing members differentially to locate appropriate digit types opposite a printing line in accord with a particular amount to be printed, elements related to said printing members and operable when in lateral registration therewith to effect printing off the located digit types, typewriting means located to require space for operation which also said elements require while they are in lateral registration with said printing members, said elements located above the unoperated typewriting means, supporting means for said elements movable laterally of the machine between a normal position in which said elements are free of the operating space required by said typewriting means, and an operated position in which said elements are in registration with said printing members, and means controlled by any of said printing members being positioned so as to locate a type of significant digit value at the printing line, to cause the operation of said cycling means to cause an operation of said supporting means from normal to operated position.

14. A record preparing machine, comprising in combination, a work-supporting carriage, three neighboring series of adjacent-order printing members, the said members of two of said series having each a row of digit types ranging from "9" to "0" and the members of the third series embodying also a row of types, all said printing members being supported for movement differentially to present appropriate types thereon opposite a printing line on said carriage, means to set up severally stopping conditions for the printing members of each of said three series to predetermine the positioning of types opposite said printing line, the stopping conditions for the correct-order printing members of said two series adapted to be set up as required for the printing of various numbers, machine cycling means, means operable by said cycling means to position said printing members of the three series in accord with the related set-up means as they may be conditioned, a printing hammer individual to every printing bar of said two series, printing hammer means for said third series of printing bars, said hammers and said hammer means adapted for hammering while in lateral registration with their related printing members, typewriting means requiring space for operation which at least some of said hammers require for hammering action, said hammers located above the unoperated typing means, springs for operating said hammers and said hammering means, releasable universal means normally blocking all said hammers and said hammer means against action, means operated by said cycling means to move said hammers and hammer means collectively between their positions of lateral registration with their related printing bars and other positions, clear to one side of the operating space required by said typewriting means, secondary, separate blocking means for the hammers of the said two series of digit printing members, controlled in view of the differential positioning of the printing members of the related series to block such hammers as are not required for printing, a device subject to the control of said work-supporting carriage to block said hammer means against hammering action when said universal blocking means is released, means operable by said cycling means to release said universal blocking means after said hammers and said hammer means are in lateral registration with their related printing members and the printing members have been positioned, and means operable by said machine cycling means to restore said hammers and said hammer means to the control of said universal blocking means.

15. A record preparing machine comprising in combination, a work-supporting carriage, three neighboring series of adjacent-order printing members, the said members of two of said series having each a row of digit types ranging from "9" to "0" and the members of the third series embodying also a row of types, all said printing members being supported for movement differentially to present appropriate types thereon opposite a printing line on said carriage, means to set up severally stopping conditions for the printing members of each of said three series to predetermine the positioning of types opposite said printing line, the stopping conditions for the correct-order printing members of said two series adapted to be set up as required for the printing of various numbers, machine cycling means, means operable by said cycling means to position said printing members of the three series in accord with the related set-up means as they may be conditioned, a printing hammer individual to every printing bar of said two series, printing hammer means for said third series of printing bars, said hammers and said hammer means adapted for hammering action while in lateral registration with their related printing members, typewriting means requiring space for operation which at least some of said hammers require for hammering action, springs for operating said hammers and said hammering means, releasable universal means normally blocking all said hammers and said hammer means against action, means operated by said cycling means to move said hammers and hammer means collectively between their positions of lateral registration with their related printing bars and other positions, clear of the operating space required by said typewriting means, secondary, separate blocking means for the hammers of the said two series of digit printing members, controlled in view of the differential positioning of the printing members of the related series to block such hammers as are not required for printing, a device to block said hammer means against hammering action when said universal blocking means is released, another device to block the third group of printing members against type-selecting movement, means to render said two devices effective under control of the work-supporting carriage, means actuatable by said cycling means to release said universal blocking means after said hammer means and said hammers are in lateral registration with their related printing members and after the printing members have been positioned, and means operated by said machine cycling means to restore all said hammers to the control of said universal blocking means.

16. A record preparing machine comprising in combination, a series of adjacent-order printing members having each a row of types including digit types ranging from "9" to "0" and also a protective-sign-type, means to position the printing members of appropriate denominational orders differentially to locate digit types opposite a printing line in accord with digits of a particular amount to be printed and to locate higher order printing members so as to locate the protective-sign-types thereof opposite said printing line, a printing hammer for each printing member, and control means for said hammers, comprising, an element movable transversely of the series of printing members for interception by the particular printing member which is the highest order one being positioned above a "0" printing position, means positionable into stopping-range of said element to shorten the said transverse movement thereof, and means, controlled by said element moving to the extents as controlled by said members to determine that only the hammers needed for the printing of significant-amount-digits become active, and controlled further by the said shortened movement of said element to determine that additional hammers for printing by protective-sign-types become active.

17. A record preparing machine comprising in combination, a series of adjacent-order printing members having each a row of types, means to set up control conditions for said printing bars to predetermine differential movements thereof to present desired types at a printing line, cycling means for the machine, means responsive to said cycling means to move said printing members in accord with the control conditions established by said set-up means, a series of printing hammers for effecting imprints off the types of said printing members presented at the printing line, a supporting carriage for said hammers, movable to take up one or another position, respectively to place said hammers into range for imprint effecting action in respect to the differentially presented types or to place said hammers out of such range to provide room for operation of other mechanism, springs to actuate said hammers, means carried on said hammer supporting carriage, normally holding said hammers against actuation by said springs, an operator on the frame to release said holding means and positioned laterally of the machine for action on said holding means only if said hammer carriage is moved to the said one position, means controlled by said printing members so that if any of the latter in a machine cycle is moved beyond a certain position it becomes conditioned for operation in the same cycle by said cycling means to move the hammer carriage to said one position, and means to operate said operator by said cycling means after said hammer carriage is in said one position, whereby release of said hammers is restricted to certain machine cycles.

18. A record preparing machine comprising in combination, a series of adjacent-order printing members having parallel, individual rows of digit types and being differentially elevatable to present appropriate digit types opposite a printing line for the printing of amounts, means to elevate said printing members differentially for presentation of appropriate digit types opposite said printing line, typewriter type bars disposed for operation from divergent positions in front of said printing members to type at a common typewriting point in said printing line adjacent to said printing members, a supporting segment for said type bars, at least in part contiguous to the front of said printing members, a series of hammers related to said printing members and adapted for operation in lateral registration with said printing members to cause imprints off the types which said printing members present at the printing line, said hammers arranged above said segment in front of said printing members and for said imprint causing operations requiring space which also some of said type bars require for operation, a support for said hammers, means to move said support transversely of said series of said printing members in opposite direction to place said hammers either in relations of lateral registration with said printing members or leftwardly clear of the operating space required by said type bars, and means to operate such of said hammers as are related to printing members which are elevated differentially to present significant-order types opposite the said printing line, comprising sensing means at a level above the said segment and said type bars, carried on said support and impositively movable thereby from a position clear of the left of the series of printing members, rightwardly against the highest order printing member presenting a significant order type at the printing line, to determine thereby which of said hammers are to operate.

19. A record preparing machine comprising in combination, a series of adjacent-order printing members having parallel, individual rows of digit types, and being differentially elevatable to present appropriate digit types opposite a printing line for the printing of amounts, means to elevate said printing members differentially for presentation of appropriate digit types opposite said printing line, a series of laterally adjacent hammers substantially at the level of the printing line, and operable to cause imprints off the types presented at the printing line, and means to operate such of said hammers as are related to the printing members which are positioned differentially to present significant order types opposite said printing line, comprising a support for said hammers movable rightwardly and leftwardly across the front of said series of printing members respectively to bring said hammers into operative relations with said printing members and means carried on said support and impositively movable thereby rightwardly therewith against the highest order printing member presenting a significant order type at the printing line, to determine thereby which of said hammers are to operate.

20. A record preparing machine comprising in combination, a series of adjacent-denominational-order printing members having parallel individual rows of types which include each digit types ranging from "9" at the bottom to "0" at the top, means to position the printing members of appropriate denominational orders differentially to locate digit types opposite a printing line in accord with an amount to be printed and to locate higher order printing members so that the "0" types thereon stand not higher than the printing line, a normally withdrawn printing hammer for each printing member, hammer operating means, and means to control said hammer operating means to operate only those printing members which are positioned differentially to locate significant-order digit types opposite the printing line, comprising, an element movable from the left side of the series of printing members directionally thereacross for interception by the leftmost printing member which stands positioned above a "0" printing position, and means controlled by said element due to its varied positions reached at interceptions to determine that only the hammers needed for the printing of the significant amount digits are operated.

21. A record preparing machine comprising in combination, a series of adjacent-denominational-order printing members having each a row of types including digit types ranging from "9" at the bottom to "0" at the top, means to position the printing members of appropriate denominational orders differentially to locate digit types opposite a printing line in accord with digits of a particular amount to be printed and to locate higher order printing members so that the "0" type thereon stand not higher than the printing line, a printing hammer for each printing member, a spring means to actuate each hammer, and control means for said hammers, comprising a hammer blocking device movable transversely of the series of printing members for interception by the particular printing member which is the highest order one being positioned above a "0" printing position and thereby to block all hammers against actuation except those needed for the printing of the significant amount digits.

22. A record preparing machine comprising in combination, a series of adjacent-order printing members having parallel, individual rows of digit types, and being differentially positionable to present appropriate digit types opposite a printing line for the printing of amounts, means to position said printing members differentially for presentation of appropriate digit types opposite said printing line, a series of hammers related to the printing members and adapted for operation in relations of operative registration with said printing members to cause imprints off the types which said printing members present at the printing line, typewriting means disposed below said hammers and at least in part directly in front of said printing members and selectively operable to type different characters at a common printing point in said printing line, said typewriting means requiring for operation space which also said hammers require for said imprint causing operations, a support for said hammers, means to move said support to place said hammers from said relations of operative registration with said printing members, clear of the operating space required by said typewriting means, and means to operate such of said hammers as are related to the printing members which are positioned differentially to present significant-order types opposite the said printing line, comprising sensing means adapted by sensing action on said printing members to determine which of said hammers are to operate, said sensing means carried on said support and movable therewith clear of the operating space required by said typewriting means.

23. A record preparing machine comprising in combination, a series of adjacent-order printing members having parallel, individual rows of digit types, and being differentially positionable to present appropriate digit types opposite a printing line for the printing of amounts, means to position said printing members differentially for presentation of appropriate digit types opposite said printing line, a series of hammers related to the printing members and adapted for operation in relations of operative registration with said printing members to cause imprints off the types which said printing members present at the printing line, typewriting means normally disposed below said hammers in front of said printing members and selectively operable to type different characters at a common printing point in said printing line, said typewriting means requiring for operation space which also said hammers require for said imprint causing operations, a support for said hammers movable transversely of said series of printing members, means to move said support transversely in opposite directions to place said hammers in relations of operative registration with said printing members or to place them clear of the operating space required by said typewriting means, springs to operate the individual hammers and movable with said support, and means to control said springs, comprising, hammer operation blocking means carried on said support for sensing movement transversely of said series of printing members against the highest order one presenting a significant digit type at the printing line and thereby adapted to block the hammers related to insignificant order printing members.

24. In combination with a record preparing machine having a series of adjacent-order printing members differentially positionable individually to locate different types thereon opposite a printing line and a typewriting means which normally is below the printing line and as an identity is stationary with respect to the printing members, said typewriting means comprising parts requiring operating space at the front of said printing members generally up to the level of said printing line, a series of elements for individual rearward actuation generally at the level of said printing line to cause printing from types on said members which have been located opposite the said printing line, movable means to support said elements rearwardly actuatable thereon, said elements collectively movable oppositely by said movable means in a generally horizontal plane to bring them either free of the required operating space for said parts, out of a relation of operative association with said printing members, or to station them in a relation of operative association with said printing members over the typewriting means, and in doing so, rendering said parts and thus the typewriting means inoperative, means to move said movable means to effect said collective opposite movements of said elements, and means to actuate said elements rearwardly after the stationing thereof by said movable means collectively in said relation of operative association with the printing members.

25. In combination with a record preparing machine having a frame supported machine cycling means, a series of adjacent-order printing members differentially positionable individually to locate different types thereon opposite a printing line, a series of elements for individual rearward actuation generally at the level of said printing line against said printing members to cause printing from types thereon which have been located opposite the said printing line, movable means to support said elements rearwardly actuatable thereon, said elements movable collectively oppositely sidewise of the machine by said movable means either out of or into a relation of operative association with said printing members, means to move said movable means to effect said collective opposite movements of said elements, spring means carried on said movable means to actuate said elements rearwardly thereon, a latch means carried on said movable means for holding normally said elements restored forwardly away from the printing members, means to restore said elements to said latch means, and means comprising said machine cycling means to release said latch means after said movable supporting means has stationed said elements in positions of operative association with the printing members.

References Cited in the file of this patent

UNITED STATES PATENTS

| 1,317,604 | Thieme | Sept. 30, 1919 |
| 1,924,653 | Gubelmann | Aug. 29, 1933 |
| 1,975,808 | Sundstrand | Oct. 9, 1934 |
| 2,183,920 | Rainey | Dec. 19, 1939 |
| 2,194,270 | Sundstrand | Mar. 19, 1940 |
| 2,202,948 | Fettig | June 4, 1940 |
| 2,272,079 | Anderson | Feb. 3, 1942 |
| 2,348,789 | Crosman | May 16, 1944 |
| 2,686,469 | Toggenburger | Aug. 17, 1954 |
| 2,687,251 | Toggenburger | Aug. 24, 1954 |